US009231709B2

(12) United States Patent
Wu et al.

(10) Patent No.: US 9,231,709 B2
(45) Date of Patent: Jan. 5, 2016

(54) TRANSMITTING AND/OR RECEIVING DATA IN A SIDE CHANNEL

(75) Inventors: Kaishun Wu, Kowloon (HK); Qian Zhang, Kowloon (HK); Lionel Ming Shuan Ni, Kowloon (HK)

(73) Assignee: The Hong Kong University of Science and Technology, Kowloon (HK)

( * ) Notice: Subject to any disclaimer, the term of this patent is extended or adjusted under 35 U.S.C. 154(b) by 75 days.

(21) Appl. No.: 13/582,734

(22) PCT Filed: Mar. 30, 2011

(86) PCT No.: PCT/CN2011/000543
§ 371 (c)(1),
(2), (4) Date: Sep. 4, 2012

(87) PCT Pub. No.: WO2011/120333
PCT Pub. Date: Oct. 6, 2011

(65) Prior Publication Data
US 2013/0010725 A1    Jan. 10, 2013

Related U.S. Application Data

(60) Provisional application No. 61/282,781, filed on Mar. 31, 2010.

(51) Int. Cl.
*H04B 14/02* (2006.01)
*H04J 3/16* (2006.01)
(52) U.S. Cl.
CPC .............. *H04B 14/026* (2013.01); *H04B 14/02* (2013.01); *H04J 3/1676* (2013.01)
(58) Field of Classification Search
None
See application file for complete search history.

(56) References Cited

U.S. PATENT DOCUMENTS 7,020,177 B2 *   3/2006 Leeper et al. ................. 375/130
7,035,663 B1 *   4/2006 Linebarger et al. ........ 455/552.1
(Continued)

FOREIGN PATENT DOCUMENTS

CN    1249091       12/1997
CN    1249091 A      3/2000
(Continued)

OTHER PUBLICATIONS

D. Cabric, S. Mishra, D. Willkomm, R. Brodersen, A. Wolisz, A Cognitive Radio Approach for Usage of Virtual Unlicensed Spectrum, Proceedings of the 14th IST Mobile Wireless Communications Summit 2005, pp. 1-4, 2005.*
(Continued)

*Primary Examiner* — Christopher Crutchfield
(74) *Attorney, Agent, or Firm* — Amin, Turocy & Watson, LLP

(57) ABSTRACT

Systems, methods, and apparatus are described that employ specially designed interference patterns to build an in-band side channel without degrading the effective throughput of the main channel. A first device (100) includes a control component (130) that generates control information and an interference component (140) that transmits the control information (450) through emission of patterned interference data concurrently while other users are transmitting other data (420). A second device (300) receives the patterned interference data and the other data via a single antenna (350) and decodes the patterned interference data to extract the control data (450). The first device (100) transmits the other data (420) on a side channel (440) that resides in the same spectrum as the main channel (410) in which the other data (420) is emitted. The first device (100) encodes the interference patterns such that the control data (450) can be safely transmitted and extracted without effecting other data transmission. In one aspect, devices (100, 200, 300) can employ a dynamic cooperation multi-access channel (DC-MAC) protocol (1510) to schedule transmission of the other data (420) on the main channel (410), and to employ the side channel (440) for control and coordination.

23 Claims, 22 Drawing Sheets

(56) References Cited

U.S. PATENT DOCUMENTS

| | | | |
|---|---|---|---|
| 7,215,713 B2* | 5/2007 | Walker et al. | 375/261 |
| 7,352,829 B2* | 4/2008 | Jalloul et al. | 375/340 |
| 7,483,711 B2* | 1/2009 | Burchfiel | 455/522 |
| 2006/0285607 A1* | 12/2006 | Strodtbeck et al. | 375/298 |
| 2009/0322587 A1* | 12/2009 | Stayton | 342/37 |
| 2010/0014615 A1* | 1/2010 | Piesinger et al. | 375/340 |

FOREIGN PATENT DOCUMENTS

| | | |
|---|---|---|
| CN | 1363151 A | 8/2002 |
| CN | 1447548 A | 10/2003 |
| CN | 101557371 A | 10/2009 |
| EP | 1594260 A1 | 11/2005 |
| EP | 2040503 A1 | 3/2009 |
| EP | 2083594 A2 | 7/2009 |
| WO | 9829978 | 7/1998 |

OTHER PUBLICATIONS

T. Barrett, History of UltraWideBand (UWB) Radar & Communications: Pioneers and Innovators, Progress in Electromagnetics Symposium 2000, Cambridge, MA, Jul. 2000, pp. 1-42.*

T. Deckert, E. Rave, G. Fettweis, Superimposed Signaling Option for Bandwidth Efficient Wireless LANs, Proceedings of WPMC 2004, Sep. 2004, pp. 1-5.*

International Search Report for International Application No. PCT/CN2011/000543 dated Jul. 14, 2011, 3 pages.

Moscibroda, et al., "Load-Aware Spectrum Distribution in Wireless LANs", Proc. of ICNP, 2008. 10 pages.

Pickholtz, et al., "Spread Spectrum for Mobile Communications". IEEE Transactions on Vehicular Technology, vol. 40, No. 2, May 1991, 10 pages.

Shah et al.. "Covert channels through external interference." Proceedings of the 3rd USENIX conference on Offensive technologies (WOOT'09). 2009.

Gummadi, et al., "Wireless Networks Should Spread Spectrum Based on Demands", In Hotnets, 2008, 6 pages.

"Wireless Medium Access Control (MAC) and Physical Layer (PHY) Specifications for Low-Rate Wireless Personal Area Networks (WPANs)", IEEE Computer Society, IEEE Std 802.15.4 2006, 323 pages.

Bao, et al., "A new approach to channel access scheduling for ad hoc networks." Proceedings of the 7th annual international conference on Mobile computing and networking. ACM, 2001.

Woo, et al., "A transmission control scheme for media access in sensor networks." Proceedings of the 7th annual international conference on Mobile computing and networking. ACM, 2001.

Wu, et al., "Chip error pattern analysis in ieee 802.15. 4." Mobile Computing, IEEE Transactions on 11.4 (2012): 543-552.

Nychis, et al., "Enabling MAC protocol implementations on software-defined radios." Proceedings of the 6th USENIX symposium on Networked systems design and implementation. USENIX Association, 2009, 15 pages.

"Universal Software Radio Peripheral", Ettus Research, www.ettus.com, accessed Feb. 4, 2013, 2 pages.

Tse et al., "Fundamentals of Wireless Communications" Chapter 7, "MIMO I: spatial multiplexing and channel modeling", pp. 290-331, 2005.

Ramachandran, et al., "Interference-aware channel assignment in multi-radio wireless mesh networks." IEEE INFOCOM. vol. 6. 2006.

Zhou, et al., "MMSN: Multi-frequency media access control for wireless sensor networks." IEEE Infocom. 2006.

Akella, et al., "Self-Management in Chaotic Wireless Deployments". MobiCom '05, Aug. 28-Sep. 2, 2005, Cologne, Germany. Copyright 2005 ACM I-59593-020-5/05/0008, 15 pages.

Jamieson, et al., "PPR: Partial Packet Recovery for Wireless Networks". SIGCOMM '07, Aug. 27-31, 2007, Kyoto, Japan, Copyright 2007 ACM 978/-1-59593-713-1/07/0008, 12 pages.

Halperin, et al., "Taking the Sting out of Carrier Sense: Interference Cancellation for Wireless LANs". MobiCom '08, Sep. 8-12, 2008, San Francisco, USA, Copyright 2008 ACM 978-1-60558-096-8/08/09, 12 pages.

Qiu, et al., "A General Model of Wireless Interference". MobiCom'07, Sep. 9-14, Montreal, Quebec, Canada. Copyright 2007 ACM 978-1-59593-681-03/07/0009, 12 pages.

Li, et al., "Capacity of Large Scale Wireless Networks Under Gaussian Channel Model". MobiCom'08, Sep. 14-19, 2008, San Francisco, California, USA. Copyright 2008 ACM 978-1-60558-096-8/08/09, 12 pages.

Katti, et al., "XORs in the Air: Practical Wireless Network Coding", SIGCOMM'06, Sep. 11-15, 2006, Pisa, Italy. Copyright 2006 ACM 1-59593-308-05/06/0009, 12 pages.

Murty, et al., "Designing high performance enterprise wi-fi networks." Proceedings of the 5th USENIX Symposium on Networked Systems Design and Implementation. USENIX Association, 2008.

Schmid, "GNU Radio 802.15.4 En- and Decoding", UCLA'06 Los Angeles, California USA, Copyright 2006 ACM, 7 pages.

Brodsky, et al., "In defense of wireless carrier sense", vol. 39. No. 4. ACM, 2009.

Pickholtz, et al., "Spread Spectrum for Mobile Communications", IEEE Transactions on Vehicular Technology, vol. 40, No. 2, May 1991, 10 pages.

Chachulski, et al., "Trading Structure for Randomness in Wireless Opportunistic Routing", SIGCOMM'07, Aug. 27-31, 2007, Kyoto, Japan. Copyright 2007 ACM 978-1-59593-713-1/07/0008, 12 pages.

Cadambe, et al., "Interference Alignment and Degrees of Freedom of the K-User Interference Channel". IEEE Transactions on Information Theory, vol. 54, No. 8, Aug. 2008, 17 pages.

"Wireless LAN Medium Access Control (MAC) and Physical Layer (PHY) Specifications". IEEE Std 802.11 2007. Copyright IEEE 2007, 1232 pages.

Gollakota, et al., "Interference Alignment and Cancellation", SIGCOMM'09, Aug. 17-21, 2009, Barcelona, Spain. Copyright 2009 ACM 978-1-60558-594-9/09/08, 12 pages.

* cited by examiner

TRANSMITTING AND/OR RECEIVING DATA IN A SIDE CHANNEL

CROSS-REFERENCE TO RELATED APPLICATIONS

This application is a U.S. National Stage of PCT Patent Application No. PCT/CN2011/000543, filed Mar. 30, 2011 and entitled "TRANSMITTING AND/OR RECEIVING DATA IN A SIDE CHANNEL"; which claims priority to U.S. Provisional Patent Application No. 61/282,781, filed Mar. 31, 2010 and entitled "FREE SIDE CHANNEL: BITS OVER INTERFERENCE". The entireties of the above-referenced applications are incorporated herein by reference.

TECHNICAL FIELD

This disclosure relates generally to wireless communications in connection with a side channel, e.g., including interference management and coordination between multiple devices.

BACKGROUND

Radio interference is an issue in wireless communications. For instance, capacity of a wireless channel depends on a ratio between signal power of a desired transmission to combined interference plus noise. Because of the broadcast nature of wireless communications, when two or more transmissions are conducted in vicinity, mutual interference is generated and collisions often occur. In a typical multiple-user environment, different users can sometimes interfere with each other.

In recent years, many research efforts have been devoted to interference management. For instance, various techniques center on interference avoidance. Interference avoidance attempts to scatter multiple transmissions along temporal, spatial and frequency dimensions to mitigate interference, e.g., where severe interference occurs. Other techniques employ interference cancellation, which attempts to recover transmission errors that are due to interference. Interference alignment and cancellation was developed to overcome the antennas-per-access point (AP) throughput by coordinating multiple APs.

In a typical multi-user environment, coordination among different users helps to avoid severe mutual interference and properly utilize shared media. However, such coordination can cost precious communication resources, and can lead to reduced network performance, even significantly degraded network performance. In traditional approaches, coordination is addressed in an either in-band or out-of-band manner. For in-band approaches, coordination traffic stays in a same communication channel as data traffic, bringing a large amount of communication overhead such as the Distributed Coordination Function Interframe Space (DIFS), Short Interframe Space (SIFS) and random back-offs in Carrier Sense Multiple Access (CSMA). Out-of-band approaches are typically designed for multiple radio systems. These approaches have conventionally dedicated one complete radio (and its associated channel resource) for coordination, and thus generate extra costs. In view of existing coordination techniques, effective coordination among multiple nodes without significantly wasting system resources has not yet been achieved.

The above-described deficiencies of conventional interference management techniques are merely intended to provide an overview of some of problems of current technology, and are not intended to be exhaustive. Other problems with the state of the art, and corresponding benefits of some of the various non-limiting embodiments described herein, may become further apparent upon review of the following detailed description.

SUMMARY

The following presents a simplified summary to provide a basic understanding of some aspects described herein. This summary is not an extensive overview of the disclosed subject matter. It is not intended to identify key or critical elements of the disclosed subject matter, or delineate the scope of the subject disclosure. Its sole purpose is to present some concepts of the disclosed subject matter in a simplified form as a prelude to the more detailed description presented later.

To correct for the above noted deficiencies of conventional interference management techniques and other drawbacks of current interference management technologies, various systems, methods, and apparatus described employ specially designed interference patterns to build a in-band side channel without degrading effective throughput of a main channel. For example, a device is described having a control component that generates control information and an interference component that transmits the control information through emission of patterned interference data concurrently while other users are transmitting other data such as normal message data. The device transmits control data on a side channel that resides on a same spectrum as the main channel in which the message data is emitted. The device encodes interference patterns such that the control data can be safely transmitted and extracted without affecting data transmission in the main channel. In one aspect, the device can employ a dynamic cooperation multi-access channel (DC-MAC) protocol to schedule transmission of the other data on the main channel, and to employ the side channel for control and coordination of data transmission.

In another example, a device employs a demodulator component that receives patterned interference data concurrently with other data reception and an error pattern analyzer component that extracts control information from the patterned interference data.

In another aspect, a wireless communication method is derived comprising, generating control information and transmitting the control information through emission of patterned interference data concurrently while other users are transmitting other data. The method can further comprise transmitting the other data on a main channel and the patterned interference data on a side channel, wherein the main channel and the side channel reside in the same spectrum. Another method is provided comprising receiving patterned interference data concurrently with other data reception and extracting control information from the patterned interference data.

In yet another aspect, a device can include means for generating control information and means for transmitting the control information through emission of patterned interference data concurrently while other users are transmitting other data. Another device can include means for receiving patterned interference data concurrently with other data reception and means for extracting control information from the patterned interference data.

The following description and the annexed drawings set forth in detail certain illustrative aspects of the disclosed subject matter. These aspects are indicative, however, of but a few of the various ways in which the principles of the innovation may be employed. The disclosed subject matter is intended to include all such aspects and their equivalents. Other advantages and distinctive features of the disclosed subject matter will become apparent from the following detailed description of the innovation when considered in conjunction with the drawings.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
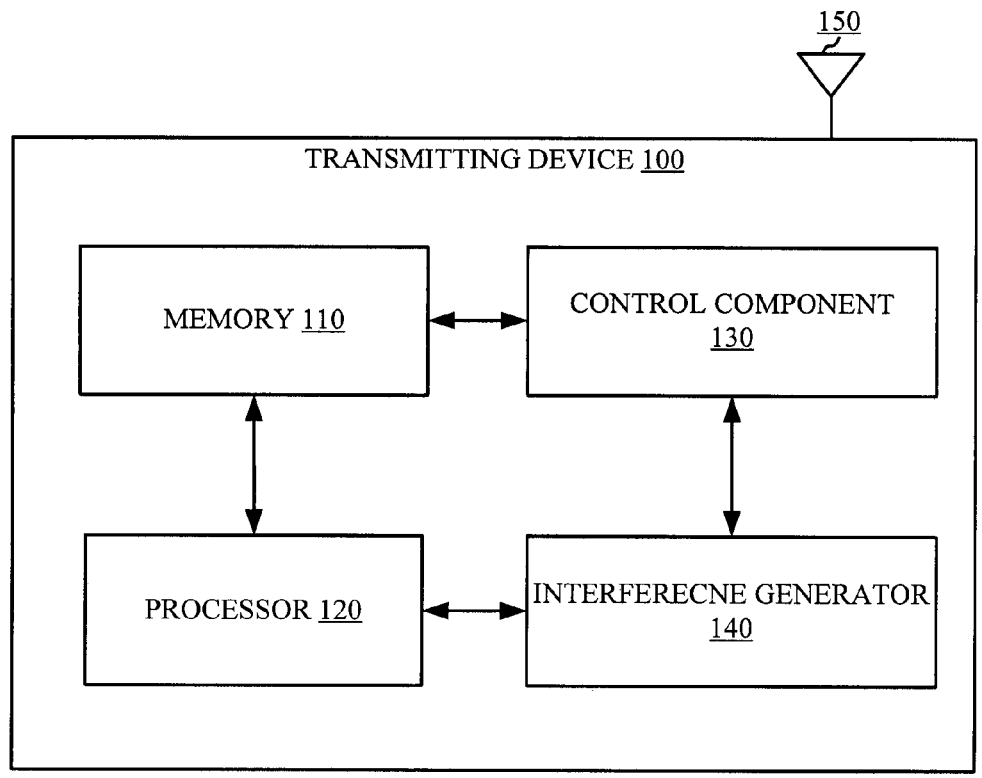
FIG. 1 illustrates a block diagram of a transmitting device, in accordance with an embodiment.

In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various computer readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

Artificial intelligence based systems, e.g., utilizing explicitly and/or implicitly trained classifiers, can be employed in connection with performing inference and/or probabilistic determinations and/or statistical-based determinations as in accordance with one or more aspects of the disclosed subject matter as described herein. For example, an artificial intelligence system can be used, by demodulator 330 (see below) to infer the interference patterns that are intentionally generated according to error patterns recognized. Furthermore, the artificial intelligence system can be used, via error pattern analyzer 360 (see below), to automatically identify error patterns and extract data carried therewith.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

Referring now to FIG. 1, illustrated is a block diagram of a transmitting device for use in wireless communication system 100, in accordance with an embodiment. Aspects of the transmitting device 100, and other devices or apparatuses explained herein can constitute machine-executable component embodied within machine(s), e.g., embodied in one or more computer readable mediums (or media) associated with one or more machines. Such component, when executed by the one or more machines, e.g., computer(s), computing device(s), virtual machine(s), etc. can cause the machine(s) to perform the operations described.

As seen in FIG. 1, transmitting device 100 includes memory 110, processor 120, control component 130, and interference generator 140. Memory 110 holds instructions for carrying out the operations of the control component 130, and the interference generator 140 when executed by processor 120. Control component is configured to generate control information. Control information can include information relating to the coordination of wireless transmissions between devices. For example, because of the broadcast nature of wireless communications, when two transmissions are conducted in vicinity, mutual interference will be generated and collisions may happen. Accordingly, to well utilize a shared medium in a typical multi-user environment, coordination is helpful. Coordination data or control data can be generated by the control component and sent to other devices in order to permit coordinated communication transmission between transmitting device 100 and the other devices.

Interference generator component 140 is configured to encode the control data generated by the control component 120 so as to generate patterned interference. Antenna 150 facilitates sending and receiving data transmissions, including control information emitted as patterned interference. Patterned interference includes intentional interference that embodies control information in the form of one or more defined patterns. For example, in wireless communication schemes, most physical layer implementations provide a certain level of tolerance to radio interference. This tolerance is however underutilized in many real environments. With the interference generator component, a user can exploit this redundant tolerance to transmit small amounts of control information by intentionally emitting patterned interference when other users are conducting their normal data transmission. As will be described supra with respect to FIG. 4, the transmission of patterned interference generates a new channel within the same spectrum as the main transmission channel referred to herein as a side channel. Side channel is based on a simple yet interesting observation that extra useful information bits can be transmitted together with the normal traffic by generating intended interference patterns. Particular modulation schemes for side channel transmission, e.g., the interference patterns for different data representation, are discussed infra with respect to FIGS. 12 and 13.

Figure 2:
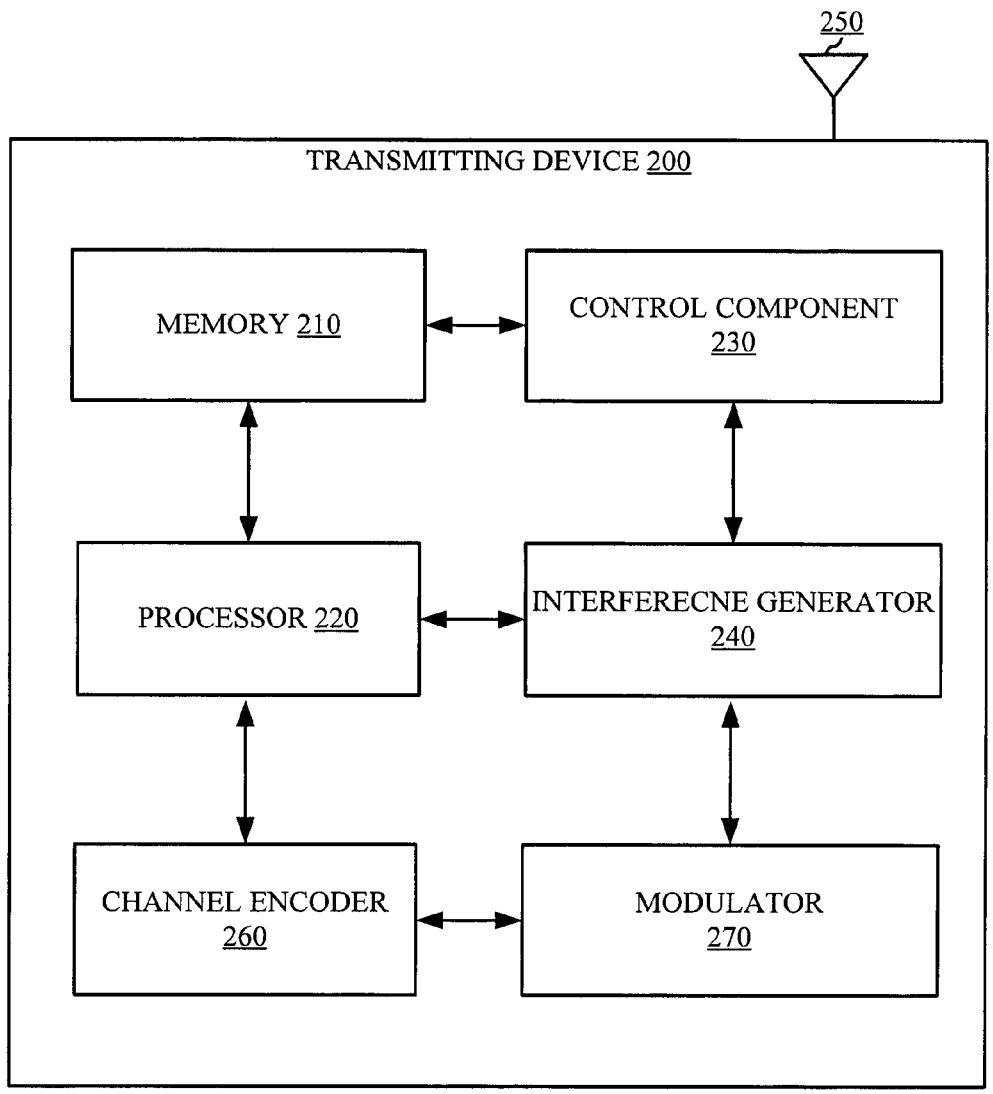
FIG. 2 illustrates a block diagram of transmitting device, in accordance with another embodiment.

Another embodiment of a receiving device 200 is depicted in FIG. 2 as a block diagram. Receiving device 200 includes memory 210, processor 220, control component 230, interference generator 240, and antenna 250. In addition, receiving device 200 includes channel encoder 260 and modulator 270. Similar to the memory 110 of transmitting device 100, memory 210 holds instructions for carrying out the operations of the control component 230, and the interference generator 240, the channel encoder 260, and the modulator, when executed by processor 220. It should be appreciated that control component 230 is configured to perform operations analogous to control component 130 and interference generator 240 is configured to perform operations analogous to interference generator 140. Receiving device 200 is configured to generate and transmit control information as interference patterns in a similar manner as receiving device 100. Antenna 250 facilitates sending and receiving data transmissions, including control information emitted as interference patterns. As will be described infra with respect to FIG. 4, patterned interference is transmitted via a side channel. In addition, particular modulation schemes for side channel transmission, e.g., the interference patterns for different data representation, are also discussed infra with respect to FIGS. 12 and 13.

In addition, receiving device 200 is configured to transmit additional data, such as message data transmitted during normal data transmission, using a traditional communication scheme. As described herein, data that is transmitted not in the main channel (see below) is referred to as standard data. Standard data does not include patterned interference data. Channel encoder 260 and modulator 270 facilitate standard data transmission. Channel encoder 260 encodes standard data according to the communication scheme employed. Similarly modulator 270 modulates the standard data according to the communication scheme employed. As will be described supra with respect to FIG. 4, standard data is transmitted via a main channel. Antenna 250 further facilitates sending and receiving standard data transmissions.

Transmitting devices 100 and 200 include any device suitable for transmitting data over a wireless communication channel on accordance with the embodiments described and claimed herein. The transmitting device 100 can include a mobile device or a stationary device. For example, transmitting device 100 can include a cellular phone, a smart-phone, a landline phone, an interactive television, a personal digital assistant (PDA), a tablet processing computer (PC), a laptop computer, a gaming device, or a home computer. It should be appreciated that additional communicating and computing devices may arise, all of which should be considered compatible additions within the architecture of subject communication system so long as they meet the minimum requirements described above.

Figure 3:
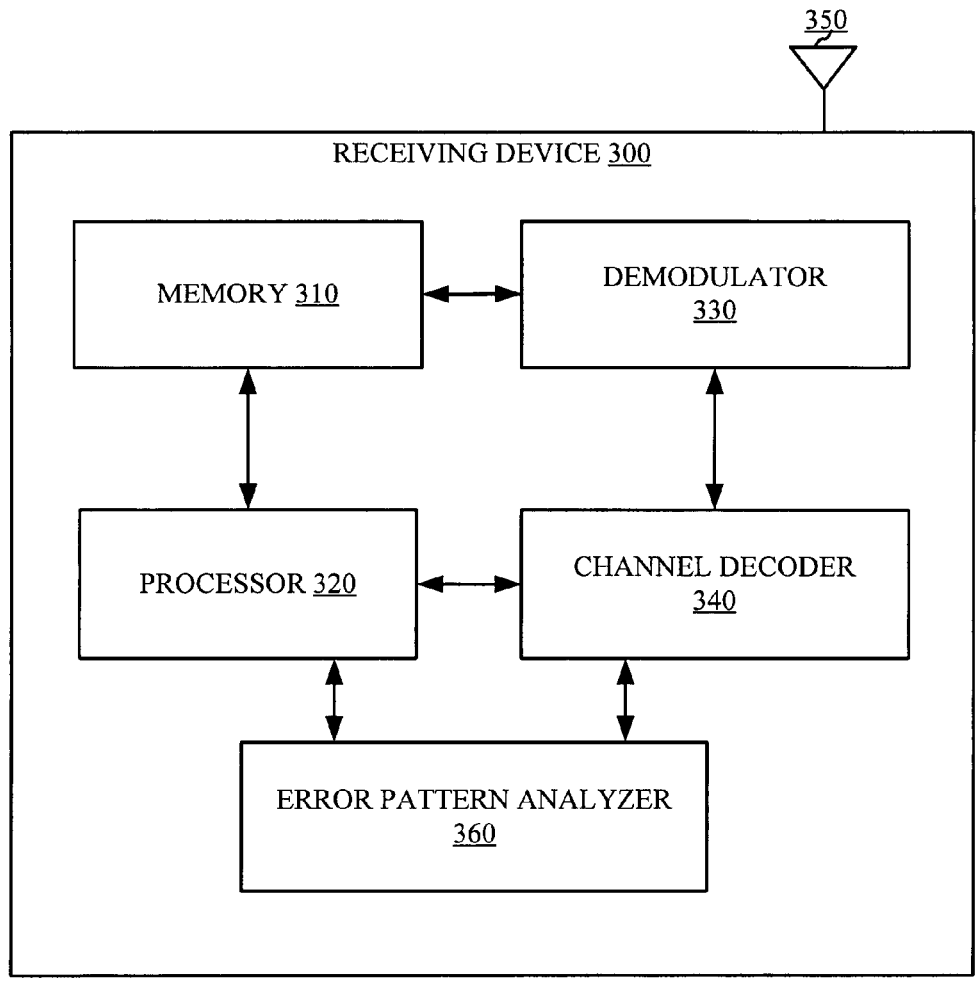
FIG. 3 illustrates a block diagram of a receiving device, in accordance with an embodiment.

Referring now to FIG. 3, depicted is a block diagram of a receiving device 300. Receiving device 300 includes memory 310, processor 320, demodulator 330, channel decoder 340, antenna 350, and error pattern analyzer 360. Memory 310 holds instructions for carrying out the operations of demodulator 330, channel decoder 340, antenna 350, and error pattern analyzer 360, when executed by processor 320. Receiving device is configured to receive control data transmissions and standard data transmission. In one aspect, receiving device 300 receives control data transmissions and standard data transmissions separately or at different points in time. In another aspect, receiving device 300 receives control data transmissions and standard data transmissions concurrently or at a same point in time. Antenna 350 facilitates receiving and transmitting data, including control data and standard data. The single antenna 350 can receive multiple transmission sessions at the same time.

Demodulator 330 functions to demodulate a received signal. For example, when a received signal includes patterned interference data the demodulator 330 extracts error pattern information associated with the patterned interference data. When a received signal includes standard data, the demodulator extracts the encoded standard data. The channel decoder 340 is configured to decode the standard data from the encoded standard data. Error pattern analyzer 340 is configured to analyze error pattern information in order to extract control information.

Receiving device 300 includes any device capable of transmitting data over a wireless communication channel. The transmitting device 100 can include a mobile device or a stationary device. For example, transmitting device 100 can include a cellular phone, a smart-phone, a landline phone, an interactive television, a personal digital assistant (PDA), a tablet processing computer (PC), a laptop computer, a gaming device, or a home computer. In addition, receiving device 300 can include an access point (AP), a fixed AP, or a wireless AP (WAP). It should be appreciated that additional communicating and computing devices may arise, all of which should be considered compatible additions within the architecture of subject communication system so long as they meet the minimum requirements described above.

Figure 4:
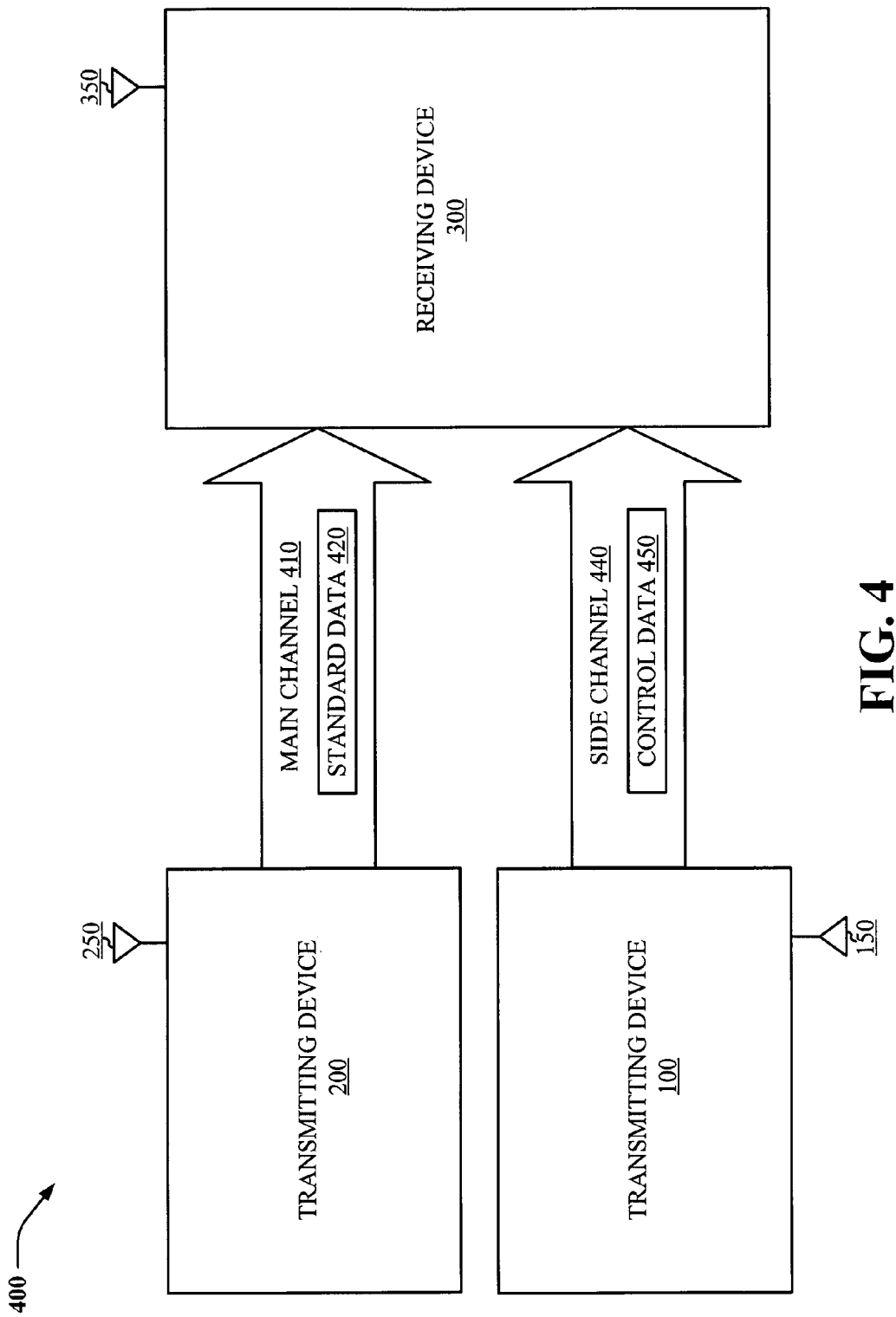
FIG. 4 illustrates a wireless communication system employing side channel data transmission in accordance with an embodiment.

Turning now to FIG. 4, depicted is a wireless communication system 400 in accordance with an embodiment. As explained herein systems 400, other systems, and related methods can constitute machine-executable instructions embodied within machine(s), e.g., embodied in one or more computer readable mediums (or media) associated with one or more machines. Such instructions, when executed by the one or more machines, e.g., computer(s), computing device(s), virtual machine(s), etc. can cause the machine(s) to perform the operations described. System 400 includes transmitting device 200, transmitting device 100, and receiving device 300. Further depicted is a main channel 410, and a side channel 440. According to system 400, transmitting device 100 transmits standard data 420 via main channel 410 to receiving device 300. Transmitting device 200 transmits control data 450 via side channel 440 to receiving device 300. As noted above, control data 450 is transmitted from transmitting device 100 as patterned interference data. In an aspect of system 400, the control data 450 is emitted while transmitting device 200 is transmitting standard data 420.

In accordance with system 400, the receiving device 330 is able to identify patterns in the patterned interference data sent from transmitting device 100. Upon recognition, the receiving device 400 obtains the carried control data. Because control data can be received concurrently with standard data, an additional channel can be built without affecting the transmission throughput in the original or main channel. As described herein, this additional channel is referred to as the side channel. The side channel 400 can be used to deliver the coordination information among users with little degraded throughput of the main data channel. However, given that the control data 450 is transmitted via intentional pattenrend interference data, the main channel 410 can lose a certain degree of interference-tolerance capability.

Unlike traditional out-of-band approaches, the side channel 440 is an "in-band" channel that resides in the same spectrum band as the main channel 410. Each individual antenna 150, 250, and 350 can independently benefit from the efficient usage of side channel 440. In addition, unlike the traditional in-band approach, no extra coordination overhead is needed when leveraging the side channel 440. For example, in a traditional "in-band" approch, the coordination traffic stays in the same communication channel as the data traffic. As a result a large amount of communication overhead is intruduced such as the Distributed Coordination Function Interframe Space (DIFS), Short Interframe Space (SIFS) and random back-offs in Carrier Sense Multiple Access (CSMA).

Figure 5:
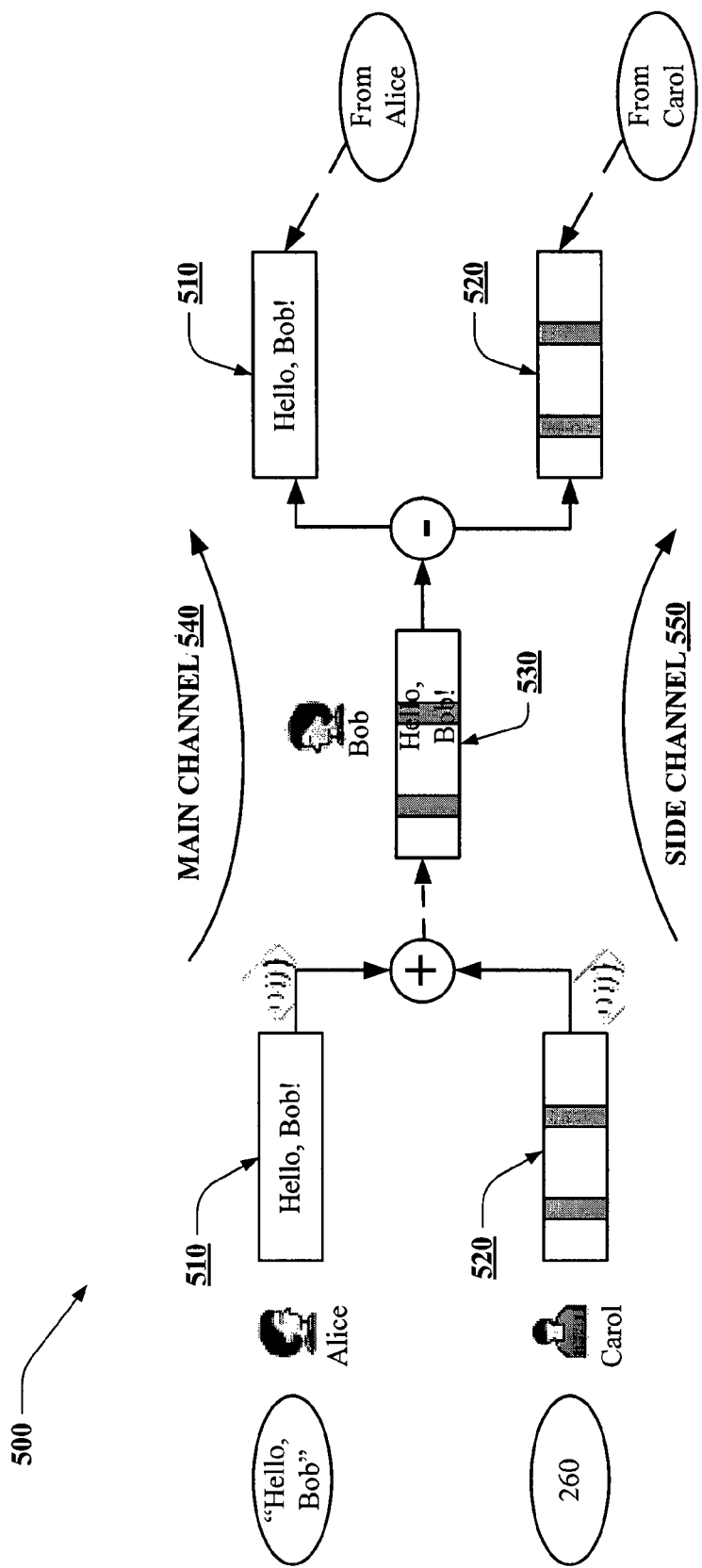
FIG. 5 presents an example of a communication scheme employing a side channel, in accordance with an embodiment.

Presented in FIG. 5 is an example communication scheme employing a side channel 550. In this example, Alice sends a message 510 to Bob in the main channel 540 using a conventional communication scheme. At the same time, Carol delivers some coordination information, (emodied in the number 260), to Bob by emitting intended interference patterns 520 to Bob in the side channel 550. The interference is strong enough so that Bob can identify its pattern, while weak enough so that the main channel traffic is not corrupted. From Bob's perspective, he is not only able to successfully decode the "Hello, Bob!" message from Alice, but also notices that the interference in the packet has certain patterns. With a pre-designed protocol, Bob can regoznize that it is Carol transmitting some coordination information (emodied in the number 260) to him.

Figure 6:
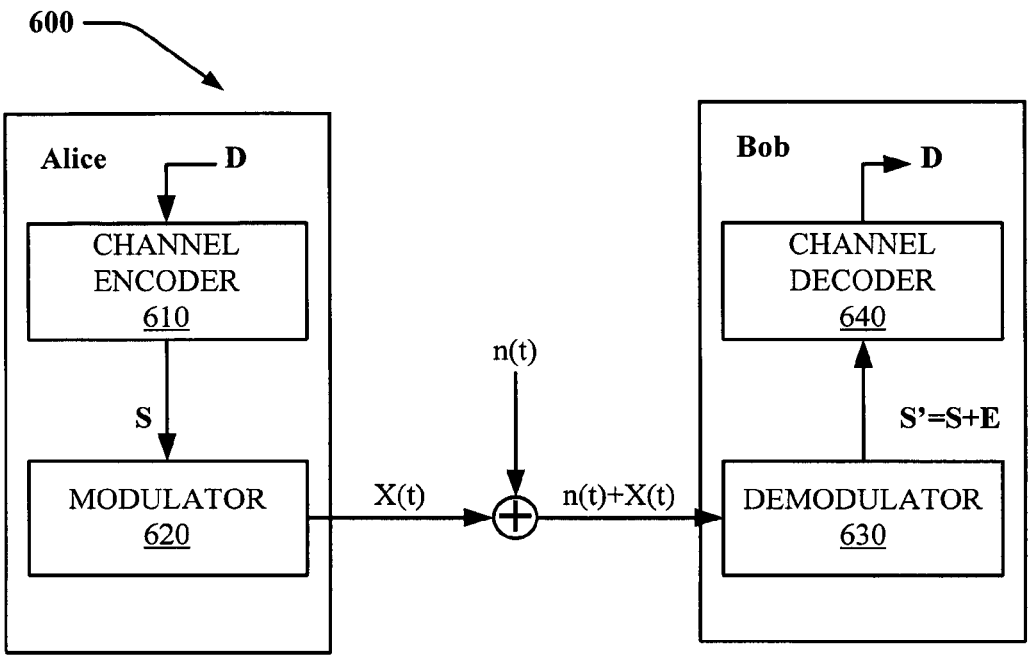
FIG. 6 depicts architecture of a communication system without side channel transmission in accordance with an embodiment.
Figure 7:
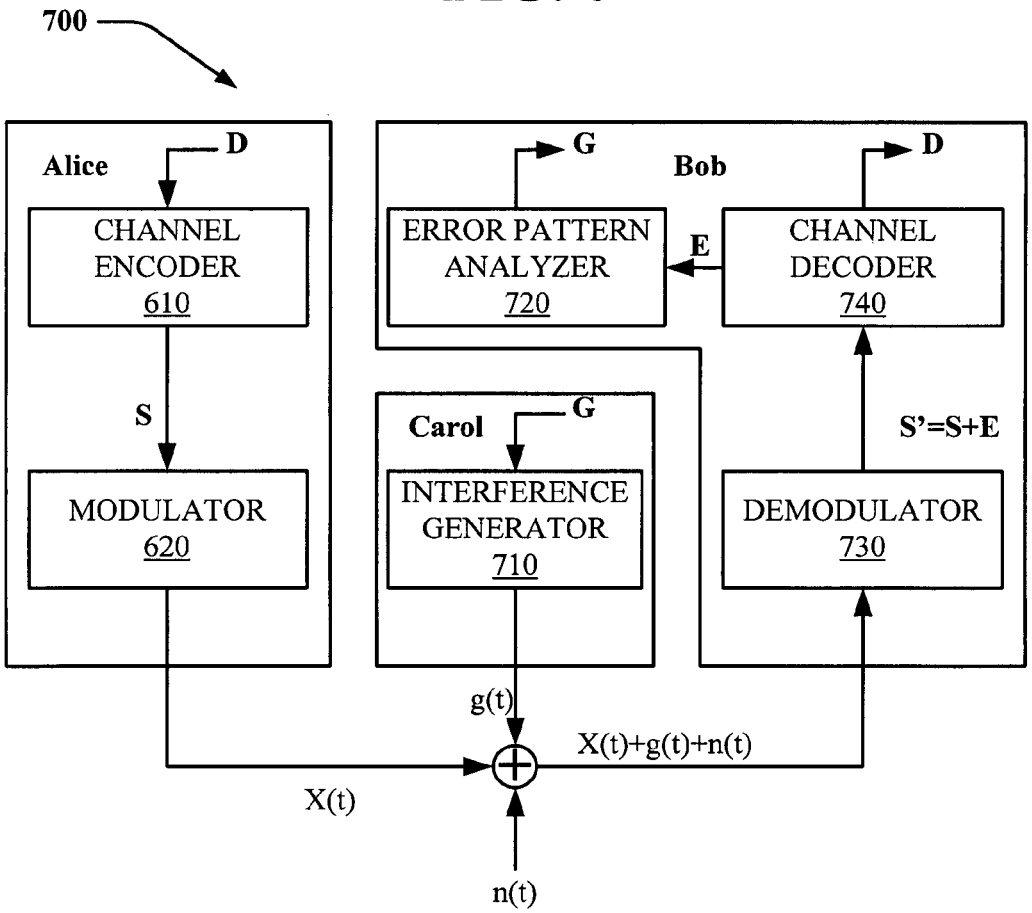
FIG. 7 depicts architecture of a communication system with side channel communication enabled in accordance with an embodiment.

Turning now to FIG. 7, depicted is the architecture of a communication system 700 with side channel communication enabled. Comparing with the traditional communication architecture in FIG. 6, sytem 700 includes some new modules including an intended interferer Carol with an interference generator 710 and an error pattern analyzer 720 in the receiver, Bob. As shown in FIG. 6, in a traditional communication system 600, channel encoder 610 encodes standard data D as S. Modulator 620 then modulates the encoded standard data S and Alice sends the modulated stanard data to the wireles medium. In system 60, x(t) is the signal encoded from the standard data D and n(t) is the white noise including external interference. Upon reciept by Bob, demodulator 630 demodulates the received signal S' into encoded standard data signal S and error pattern information E. Channel decoder 640 in turn extracts standard data D from S'.

In contrast to system 600, FIG. 7 depicts a system 700 with side channel-enabled communications. According to system 700, the sender in the main channel, Alice, works the same as in a the traditional system 600. However, system 700 introduces an intended interferer Carol. Intended interferer Carol sends data G in the side channel. In an aspect of system 700, the interference generator 710 encodes control data G and sends it to the wireless medium. At the receiver end, Bob receives a signal comprising x(t)+g(t)+n(t), where x(t) is the signal encoded from the standard data D, n(t) is the white noise including external interference, and g(t) is the intended interference that carries Carol's control data G. Upon receipt, demodulator 730 demodulates the received signal S' into encoded standard data signal S and error pattern information E. Channel decoder 740 in turn extracts standard data D from S'. At the same time, error pattern analyzer 720 can conduct error pattern analyisis to decode Carol's control data G from error pattern information E. Thus, according to system 700, Bob can get information D from Alice in the main channel and information G from Carol in the side channel.

Figure 8:
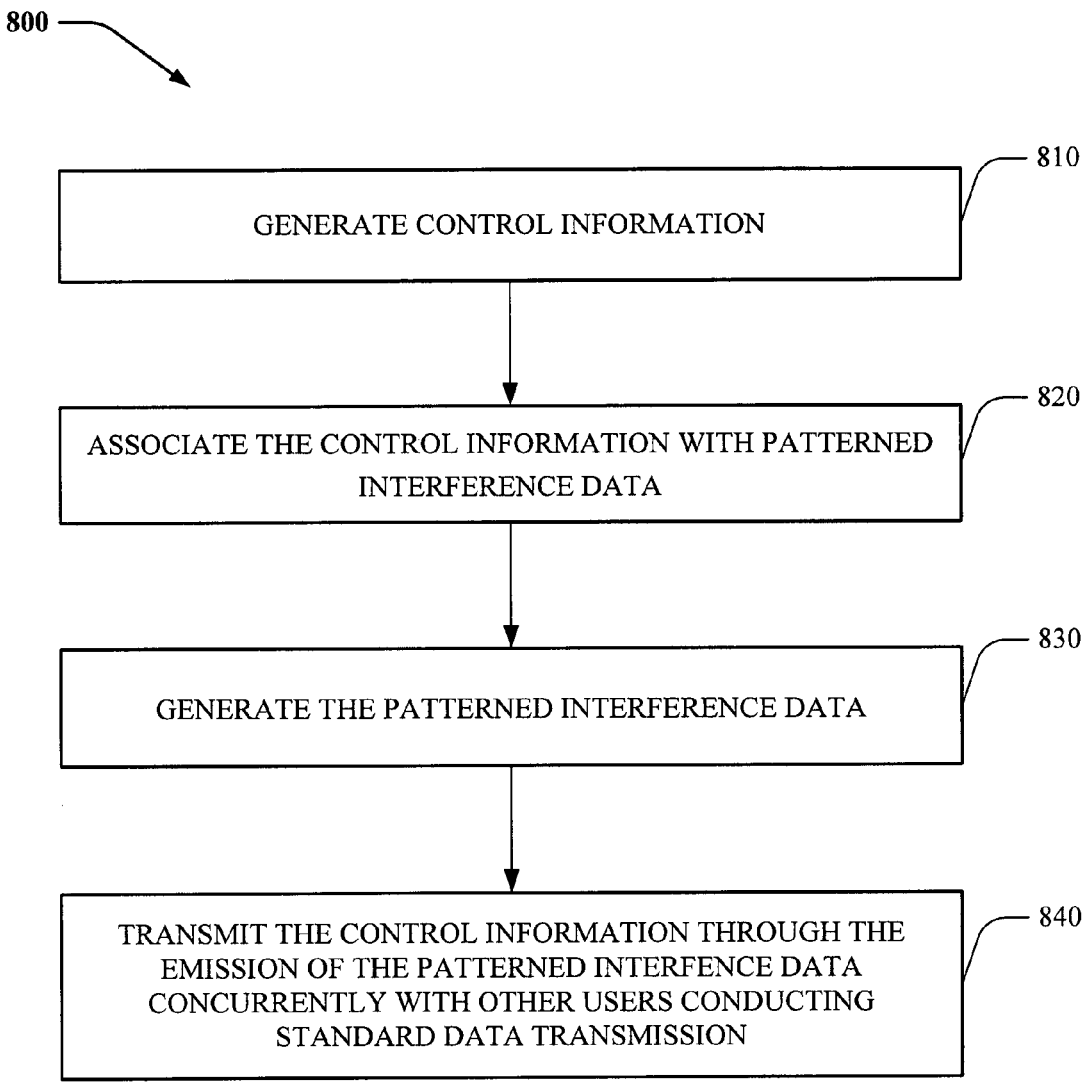
FIGS. 8-10 illustrate various processes associated transmitting and receiving control data as patterned interference, in accordance with an embodiment.
Figure 9:
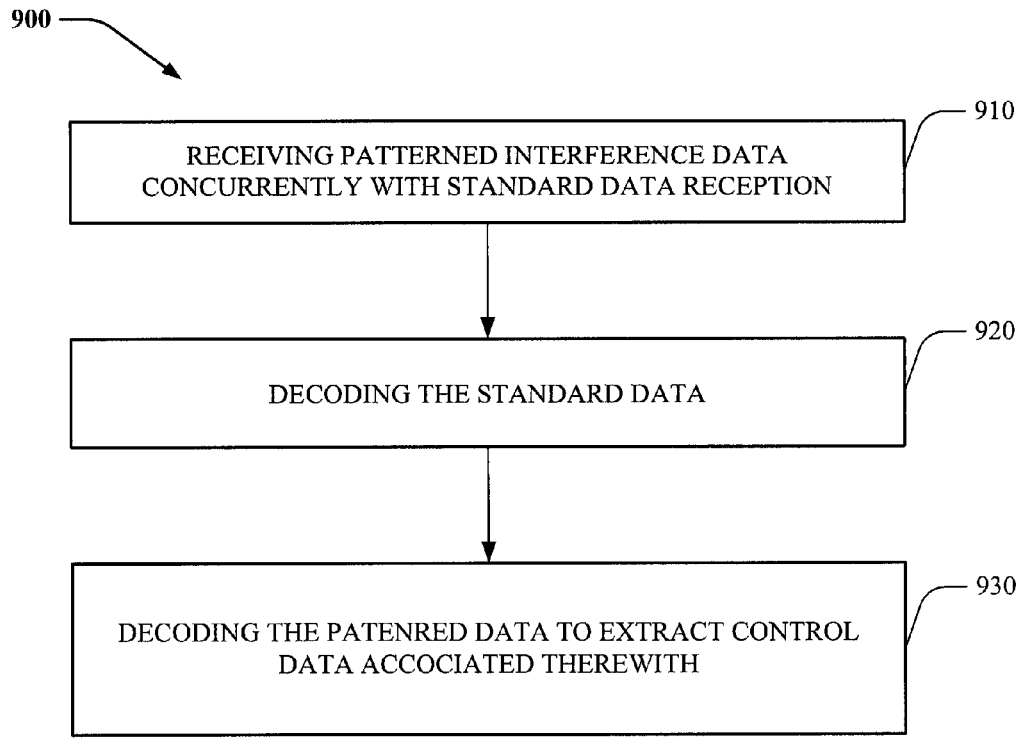
Figure 10:
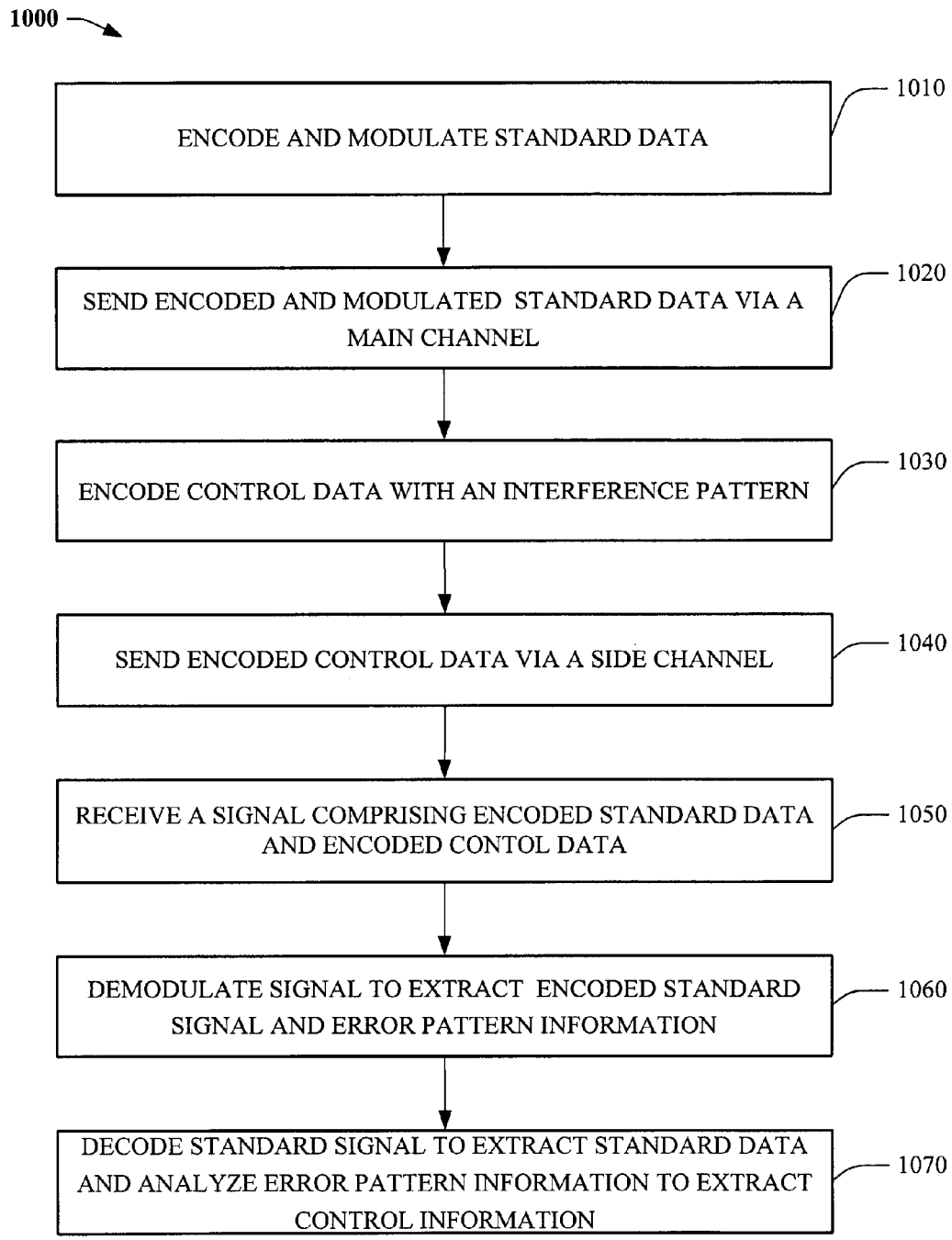

FIGS. 8-10 illustrate methodologies in accordance with the disclosed subject matter. For simplicity of explanation, the methodologies are depicted and described as a series of acts. It is to be understood and appreciated that the subject innovation is not limited by the acts illustrated and/or by the order of acts. For example, acts can occur in various orders and/or concurrently, and with other acts not presented or described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Referring now to FIG. 8, a process (800) for sending control data as emitted pattern interference is illustrated, in accordance with an embodiment. At 810, control information is generated. For instance, the control information can include data that facilitates coordination of wireless transmission for multiple devices. At 820, the control information is associated with patterned interference data. At 830, the patterned interference data is generated. Lastly, at 840, the control information is transmitted through the emission of the patterned interference data concurrently with other users conducting standard data transmission.

Referring now to FIG. 9, a process (900) for receiving control data as emitted pattern interference is illustrated. At 910, patterned interference data is concurrently received with standard data reception. At 920, the standard data is decoded. Then at 930, the patterned data is decoded to extract control data associated therewith.

Referring now to FIG. 10, a process (1000) for sending and receiving data in a main channel and a side channel is illustrated. At 1010, standard data is encoded and modulated. At 1020, the encoded and modulated standard data is sent via a main channel. At 1030, control data is encoded with an interference pattern. At 1040, the encoded control data is sent via a side channel. At 1050, a signal comprising the encoded standard data and the encoded control data is received. At 1060, the signal is demodulated to extract the encoded standard signal and error pattern information. Lastly, the standard signal is decoded to extract the standard data and the error pattern information is analyzed to extract the control information.

As described above in various systems and methodologies, by generating intended interference in the form of patterns, control data can be carried with interference patterns. A receiving device can merely recognize these patterns and obtain the carried control information. The interference patterns further do not substantially affect the main channel because most physical layer implementations provide a level of tolerance to radio interference. In addition, because data is communicated as interference patterns, an additional channel within the same spectrum as the main channel, the side channel, is created. The efficiency and performance of the side channel is at least a function the amount of control information that can be carried by the interference patterns such that it will not ruin the main channel communication as well as the exploitation of a theoretical upper bound of the side channel capacity in a practical environment.

The following description provides elements of an efficient side channel in accordance with the subject disclosure. For ease of presentation, the design of side channel is based on IEEE 802.15.4 ZigBee standard which is widely used in Wireless Sensor Networks. The ZigBee IEEE 802.15.4 standard is selected for its simplicity and because it is a typical redundant coding scheme. IEEE 802.11b is also based on Direct-Sequence Spread Spectrum (DSSS), and thus the Side channel design is the same. Although the design of the side channel described herein is based on IEEE 802.15.4 ZigBee standard, it should be appreciated that additional communication standards are within the spirit of the subject disclosure.

ZigBee employs (DSSS) at the physical layer (PHY) to resist radio interference and noise. In the 2.4 GHz worldwide band, an m-bit data packet $D\epsilon\{b_i\}^m$ will be chopped into symbols $D\mapsto S\epsilon\{s_j\}^{m/4}$. Each symbol S will be mapped to one of the 16 predefined n-bit chip sequences. That is $S\mapsto X\epsilon\{x_k\}^n$, $k\epsilon[1,n]$, where n is equal to 8 m. As used herein, a chip is a binary representations in a lower layer than the information bits. The chip sequence X is then modulated to the radio frequency x(t) and sent to the wireless medium. For example, in IEEE 802.15.4, every 4-bit is encoded into a 32-chip sequence, corresponding to m=4 and n=32 (n=8 m).

At the receiver end, the signal becomes x'(t)=x(t)+n(t). Here n(t) is the noise which may also include external interference. Upon getting the signal, the receiver demodulates it to the chip sequence X'. The receiver correlates the received sequence X' with each of the 16 desired chip sequences, selects one with the minimum number of bit differences, and maps it back to D'. The chip errors $E_X$ are defined as $E_X=X'\oplus X$ and the symbol error $E_S$ is defined to be $E_S=S'\oplus S$ where $\oplus$ is the XOR operation of two binary sequences.

When S=S' (i.e., $E_S=\{0\}^{m/4}$), D'=D and denoting successful transmission of data packet D.

One concern when designing a side channel is to determine the conditions under which the side channel is nearly harmless to the performance of the main channel in terms of Packet Reception Rate (PRR). The amount of control information that can be carried by interference patterns such that it will not ruin the main channel communication is a function of a modulation scheme for the interference patterns. Prior to discussing particular modulation schemes for side channel transmission, design principles of side channel design are presented. Table 1 lists some notations and concepts that are used herein.

TABLE 1

Concepts and Notations

| | |
|---|---|
| Bit $b_i$ | The information bit in data packet |
| Symbol $s_i$ | Every 4 bits are encoded as a symbol |
| Chip $x_i$ | The physical layer data representation unit; and only 16 sequences of 32 chips are used to represent symbols and other are unused; |
| SEP | The symbol error probability |
| f/f$^{-1}$ | An encoding scheme f: $\{s_i\}^m \to \{x_i\}^n$, f$^{-1}$ is its corresponding decoding |
| $\delta(f)$ | The error correction capability of an encoding/decoding scheme |
| h | The maximal number of chips that can safely be interfered in a symbol |
| K | The number of actually interfered chips per symbol |

Figure 11:
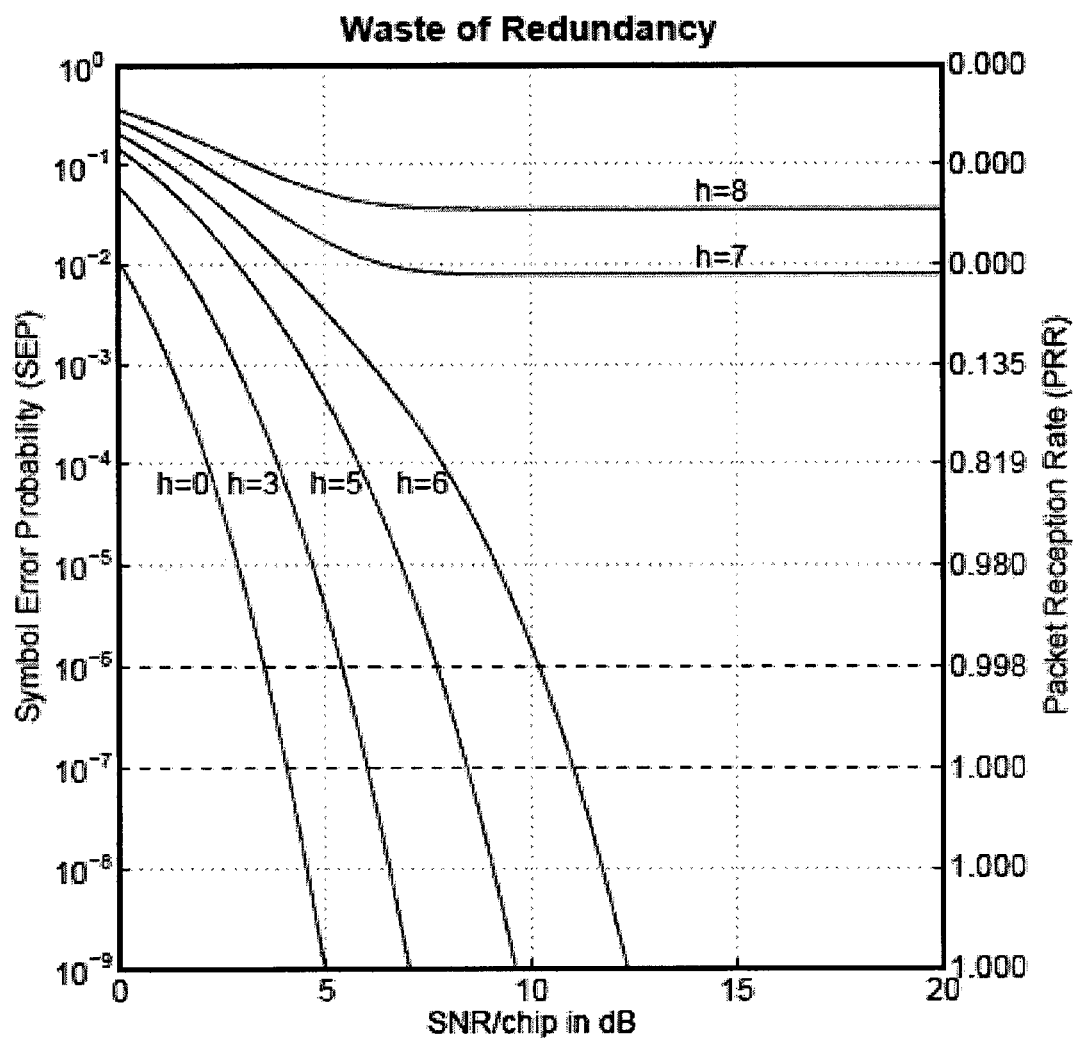
FIG. 11 presents a graphical representation of waste redundancy.

To this end, key parameter h, is derived as the maximal number of chips per symbol that can safely interfere with no harmful effects to that symbol. In order to be safe or harmless to the main channel, the joint effect of intended interference and noise should not go beyond the error correction capability (ECC) of main channel. To this end, Symbol Error Probability (SEP) is used to measure the quality of the main channel transmission. SEP is defined as the probability that the symbols will be incorrectly transmitted over a transmission. Assuming each symbol error will result in a packet error, the relation between SEP and the Packet Reception Rate (PRR) is shown in FIG. 11. In FIG. 11, the left axis is the SEP and the right axis corresponds to the PRR. A desired SEP is 0. In an example, if PRR is required to be above 998%, then the desired SEP should be less than $10^{-6}$.

The SEP depends on several factors. The first factor is the ECC of the encoding/decoding scheme applied by the main channel. The ECC is defined as follows.

Definition. Given an n-bit binary vector $E=\{e_i\}^n$, $e_i \in \{0,1\}$, its hamming weight W(E) is defined as the number of 1s in E, i.e., $W(E)=\Sigma_{i=1}^n e_i$ Definition. Given an encoding/decoding scheme f/f$^{-1}$, $$f: \{s_i\}^m \to \{x_i\}^n$$

$$f^{-1}: \{x_i\}^n \to \{s_i\}^m$$

its error correction capability $\delta(f)$ is defined as the maximal number of chip errors that f can correct, i.e., $$\delta(f)=\max(W(E_c))$$

where $E_c \in \{E | f^{-1}(f(S) \oplus E)=S, \forall S \in \{s_i\}^m\}$.

According to the encoding/decoding theory, $\delta(f)$ of a given f/f$^{-1}$ is the half of the minimal Hamming distance between any pairs of the encoded binary vectors by f, i.e., $$\delta(f)=\lfloor 1/2 \min(W(f(u) \oplus f(v)), \forall u,v \in \{s_i\}^m)\rfloor$$

According to the current symbol mapping scheme in IEEE 802.15.4, the shortest Hamming distance between any two valid 32-Chips is 13. In other words, its' $\delta(f)$ is 6.

The second influential factor of SEP is the Signal-to-Noise-Ratio (SNR) of the channel. This factor has a direct connection with chip error probability, which is defined as the probability that a chip is interfered to be an erroneous one at the receiver side. Notice that the interference is independent to the state of the original chip, and therefore the upper limit of chip error probability is 0.5 regardless that it is due to the white noise or the intended interference. Chip error probability caused by the noise (including unintended external interference) is denoted by $P_N$ and $P_I$ denotes chip error probability caused by the intended interference patterns g(t). In view of the above, and according to digital communication theory SEP is defined as follows:

$$SEP = \sum_{j=\delta(f)+1}^{n} \sum_{r=0}^{h} \binom{h}{r} P_I^r (1-P_I)^{h-r} \binom{n-h}{j-r} P_N^{j-r}(1-P_N)^{(n-h)-(j-r)} \quad \text{(Equation 1)}$$

where n is the number of chips per symbol.

By setting n=32, $\delta(f)$=6, $P_N$ and $P_I$ to their upper limit 0.5, the impact of number of interfered chips per symbol h that varies from 0 to 8, can be can be evaluated. Equation (1) is embodied in FIG. 11. Analysis of FIG. 11 and Equation 1, wherein n=32, $\delta(f)$=6, $P_N$ and $P_I$ are set to 0.5 results in the following observations.

First, h should not exceed $\delta(f)$. Otherwise, the PRR will be decreased, leading to a degraded main channel performance. For instance, PRR is nearly 0 when h=7. Second, when the channel condition is excellent (e.g., SNR>15 dB), h has a minor impact on the main channel performance as long as h≤$\delta(f)$. In that case, setting h=$\delta(f)$ fully exploits the main channel tolerance capability and maximizes the capacity of the side channel. Third, when the channel condition is intermediate, a certain degree of the interference tolerance can be exploited, leaving the remainder for noise. For example, when SNR is around 6 dB and 99.8% PRR is desired, setting h to 3 is an attractive option. At last, when the channel conditions are poor, the main channel will strive to recover the transmission errors. In that case, the employment of side channel may not be an appropriate option.

In the following description, the design of the side channel is described based on the above observations. In particular, various modulation schemes for the interference patterns for different data representation are discussed.

In an aspect of the subject disclosure, a modulation scheme provides sufficient interference such that it is identifiable while remaining harmless to the main channel. Because $P_I$ is restricted by an upper limit of 0.5, single chip interference does not provide sufficient reliability to be identified. Accordingly, a modulation scheme that produces a consecutive number of interfered chips helps to facilitate identification. In an aspect, the modulation scheme of the patterned interference data results in a maximum number of consecutive interfered chips without causing harm to the main channel. In another aspect synchronization among multiple users is optimized by synchronizing the sender and the interferer at the chip-level. When the sender and the interferer are chip-level synchronized, information can be represented by interfering different positions in a 32-chip symbol. A modulation scheme comprising chip-level synchronization allows more information to be carried than alternative synchronization schemes.

Where chip-level synchronization is affected by hardware constraints, alternative synchronization schemes are desirable.

Figure 12:
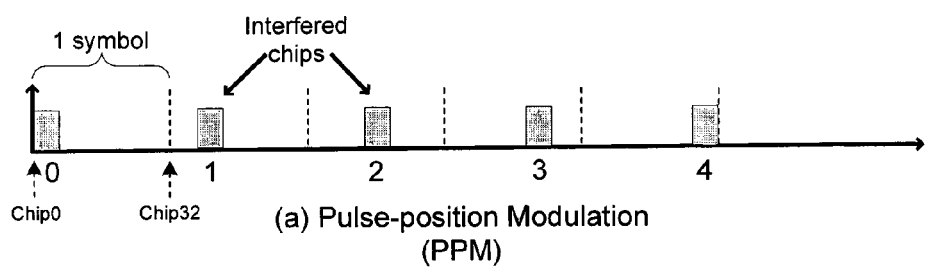
FIG. 12 illustrates a pulse-position modulation (PPM) scheme for a side channel in accordance with an embodiment.

Turning now to FIG. 12, presented is an embodiment of a Pulse-Position Modulation scheme (PPM) 1200 that can be employed to modulate interference patterns in accordance with an embodiment. In one aspect, PPM is employed when chip-level synchronization is available. PPM provides a higher channel capacity of the side channel as compared to alternative modulation schemes. The core idea of PPM is to represent data by interfering chips at different positions. As illustrated in FIG. 12, the 32 chips in each symbol are divided into several groups and each group contains K consecutive chips (thus 32/K groups per symbol). For each symbol, the interferer interferes chips in one group at most. When the receiver receives the data in main channel, by checking which group is interfered, it can interpret the carried information.

Under a theoretical analysis, side channel capacity with a PPM scheme is as follows. When PPM is adopted, a side channel can be formed as an M-ary channel where M=32/K. By assuming a pattern with K interfered chips can be identified when at least 2 out of K chips are successfully interfered with chip error, and wherein P is the probability that the receiver identifies a pattern in the symbol, the following equation is derived.

$$p = 1 - (1-p_I)^K - Kp_I(1-p_I)^{K-1}$$

where $p_I$ is the chip error probability of interference patterns. The resulting channel capacity C can be calculated as follows:

$$C = P \log M / T \quad \text{(Equation 2)}$$
$$= (1 - (1-p_I)^K - Kp_I(1-p_I)^{K-1}) \log 32 / K / T$$

where T is the duration of one symbol. The duration T can be calculated by the main channel's data rate. In order to maximize the transmission reliability of a side channel, the parameter K is set as the maximal of K=6. Assuming the optimal main channel in which $P_I$ is equal to its upper limit of 0.5, the corresponding channel capacity is C(K=6, $P_I$=03)=129 Kbps.

Figure 13:
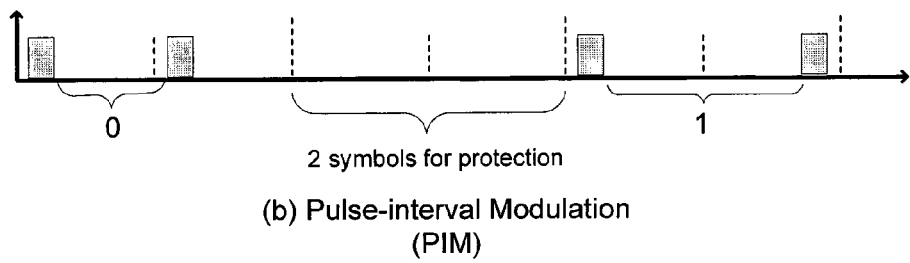
FIG. 13 illustrates a pulse-interval modulation scheme (PIM) in accordance with an embodiment

Looking at FIG. 13, presented is an embodiment of another modulation scheme 1300, Pulse-Interval Modulation (PIM) that can be employed to modulate interference patterns in accordance with a side channel. PPM has an assumption that chip-level synchronization between nodes is available. For systems of no such support, PIM serves and an alternative modulation scheme PIM. PIM uses relative positions of interfered chips rather than absolute positions. The positional information is represented by different intervals between two consecutive interfered chips. Accordingly, on the time synchronization between users is not required. Notice that although it is difficult to synchronize the behaviors of the interferer and the receiver, the behaviors of a single entity are easily controlled. Therefore the relative positions of two consecutive interfered chips are kept unchanged at the receiver end.

As illustrated in FIG. 13, PIM messages are encoded in every four symbols. Again each interferer interferes K chips to increase the reliability of the interference patterns being identified. This interference is repeated in consecutive symbols, while the interval between the two groups of K chips is adjusted according to the different information being encoded. After these two symbols are interfered, two symbols following immediately thereafter are not interfered to ensure protection.

In order to analyze side channel capacity using PIM, it is assumed that the first group of interfered K chips starts at chip 0. Next, K is set to 8 with 2 additional chips for protection and the second group of interfered chips must be at least in the second symbol. To provide protection, only a limited number of positions are valid for this group of interfered chips. The first possible position is 0, and 2K consecutive positions will become exclusive. Therefore the second possible position is only 17, and the third is 34. The third state at 34 is invalid as it exceeds 32. In other words, a side channel with PIM has only 2 states in 4 symbols in PIM. Accordingly, the data rate of PIM scheme under ZigBee is log 2/4T=15 Kbps.

In accordance with the modulation schemes above, demodulation of the side channel is required in order to extract error pattern information. In an aspect, demodulation of the side channel is not simply a reverse of modulation but a process that infers the interference patterns that are intentionally generated according to error patterns recognized. The design choices of demodulation are mainly affected by two factors. First, there is a high probability that intended interference does not cause any chip errors even when a large number of consecutive chips are intentionally interfered. Second, error patterns may also be caused by external interference or noise. Such error patterns should not be considered as the information delivered over the side channel.

These two factors lead to two categories of demodulation error: false negative and false positive. Unfortunately, neither affects can be completely avoided. False negatives can be considered as a data erasure on the side channel. In an aspect of the disclosure, in order to mitigate a false negative, coding is repeated, e.g., generating the same intended interference pattern for several times. A false positive generally occurs when the main channel condition is poor. False positives can be identified where there is only one erroneous chip in a large number of consecutive ones that are intentionally interfered. When a false positive is identified, the usage of a side channel to transmit control information is less effective. Accordingly alternative interference management methods may be employed.

Implementation of the side channel is now described. In one aspect of side channel implementation, GNU Radio is employed as the basic platform. IEEE 802.15.4 is employed as the basic network standard since the GNU Radio software project has a mature 802.15.4 PHY layer implementation. Recalling a side channel exploits the information from the chip level, implementation involves all layer of the network stack. The Universal Software Radio Peripheral version-2 devices (USRP2) are employed as the hardware platform. For example, with reference to FIG. 4, each device, 100, 200 and 300 are equipped with a XCVR2450 daughterboard for 2.4 and 5 GHz communications, employed as either a transmitter or a receiver. When used as a transmitter, the device has a DAC rate of 400M samples/s. When used as a receiver, the device has an ADC rate of 100M samples/s. The software aspect is based on a modified existing work of IEEE 802.15.4 PHY.

Figure 14:
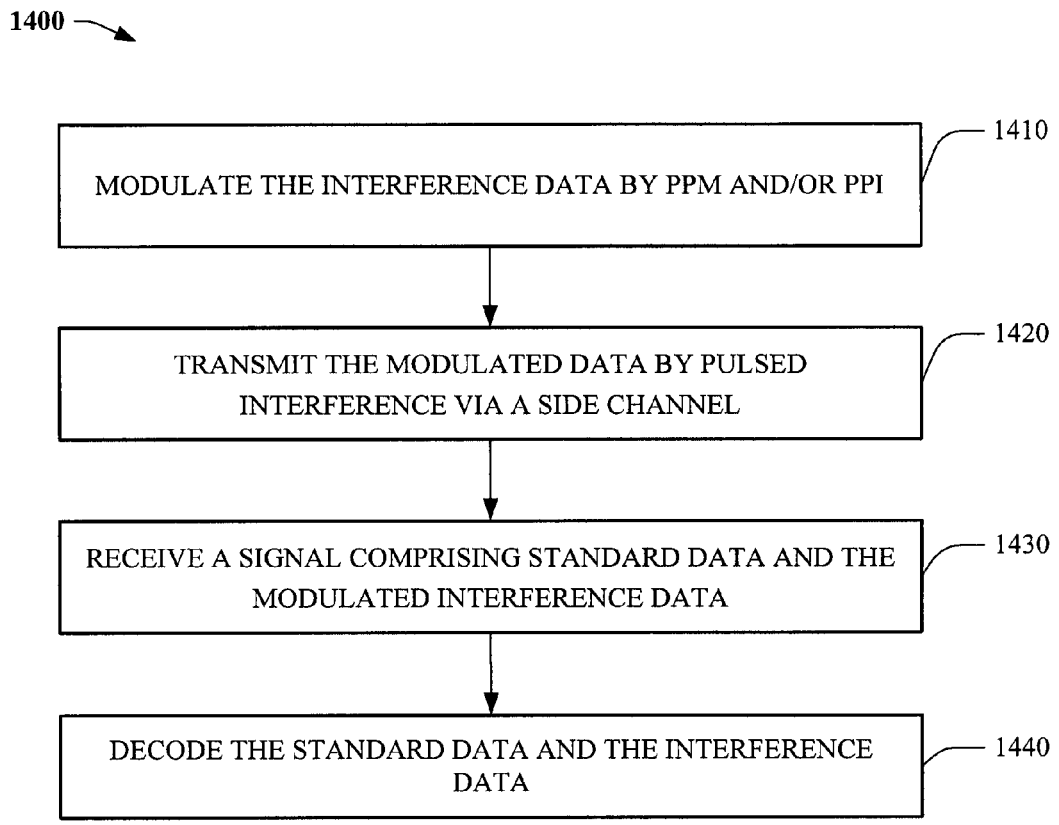
FIG. 14 illustrates a process associated with transmitting and receiving control data as patterned interference in accordance with an embodiment.

FIG. 14 presents a detailed process of side channel implementation. The key goal in side channel implementation is to encode information as intended interference such that it can be decoded by the receiver upon receipt. Looking now at FIG. 14, at 1410 the transmitter first modulates the interference data by PPM and/or PIM. At 1420, the modulated information is then sent out by pulsed interference generated by the transmitter. A timestamp mechanism in USRP2 is employed to achieve chip level synchronization. To guarantee that the chips in a symbol are affected, the duration of pulsed interference is set to 6 chips. In one aspect, in order to capture the transmission in the main channel, the power of the interference signal is set to twice that of the main channel transmission power. At 1430, a signal is received and at 1440 the receiver decodes the payload in main channel, the standard data, and the information in side channel, the interference data. Various methods are contemplated in order to determine a best-match chip sequence. In one aspect, a maximum likelihood decoder (MLD) is employed to determine the best match-chip sequence. The side channel decoder collects statistics when the MLD decodes the payload. Using an appropriate demodulation method, the receiver can obtain the information in side channel.

Described above are systems and methods of employing a side channel to transmit control information with intended interference patterns. A side channel as disclosed herein can be employed using a variety of access protocols and communication infrastructures. For example, a side channel designed for code-division multiple access (CDMA), time-division multiple access (TDMA), frequency-division multiple access (FDMA), and carrier code-sense multiple access (CSMA/CA) is envisioned. In addition, a side channel can be employed in an ad-hoc model. In one aspect, a side channel employs a multiple access control (MAC) protocol in an ad-hoc environment. According to one embodiment, a side channel employs a dynamic MAC protocol (DC-MAC).

Targeting more efficient usage of the wireless medium, DC-MAC is design protocol for a higher network throughput on provision of fairness among different users. DC-MAC provides the following benefits in conjunction with a side channel. First, the main channel be aggressively accessed by standard data transmission while overhead such as the carrier-sense, DIFS, SIFS and random back-offs is not necessary for network throughput. Second, collision-free transmission is achieved which allows every data packet to provide a net gain. Third, fairness is provided in the sense that different users can get a similar amount of opportunities to access the medium. Fourth, collisions in the side channel (e.g., two users try to use side channel simultaneously) are avoided.

DC-MAC is designed for the infrastructure mode which accounts the dominating portion of common wireless networks. A general wireless infrastructure mode comprises an access point (AP) and the other associated nodes as clients. Communications in a main channel are only conducted between clients and APs. Herein, a communication session from an AP to a client is a download while a communication session from a client to an AP is an upload. Both uploads and downloads are considered communication. In a communication, there are two transmitting operations, one for data and the other for the acknowledgement. A transmission operation from an AP to a client is called downlink, which can either be for data or for acknowledgement. The reverse direction operation, called uplink, is similar.

Figure 15A:
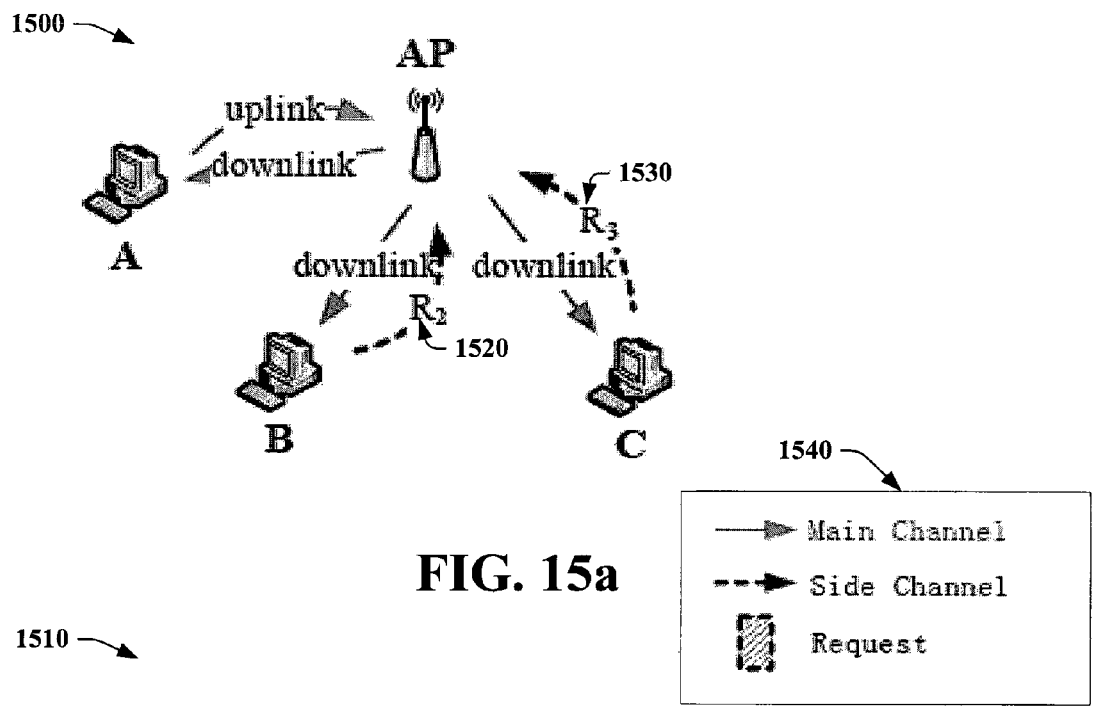
FIG. 15a illustrates a system employing a dynamic medium access control (DC-MAC) protocol in accordance with an embodiment.
Figure 15B:
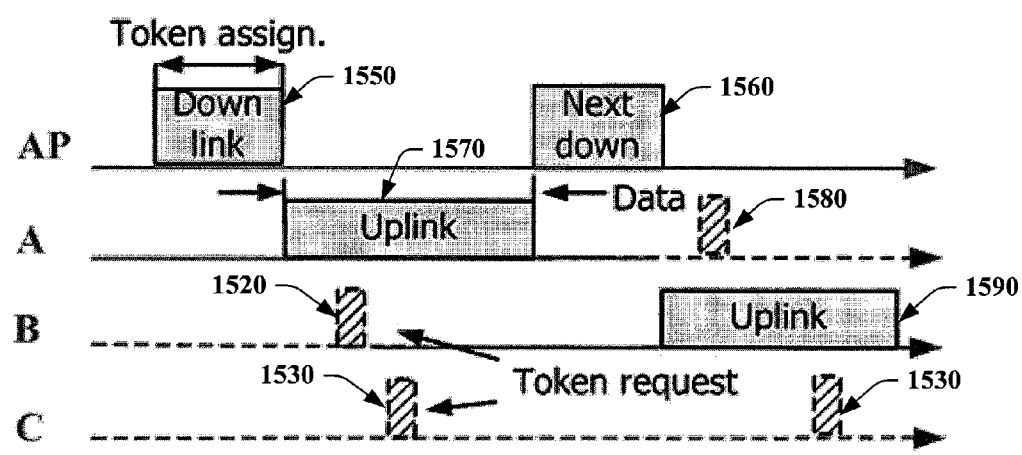
FIG. 15b illustrates DC-MAC operations in time series in accordance with an embodiment.

Turning now FIGS. 15*a* and 15*b*. FIG. 15*a* depicts a system 1500 employing DC-MAC. FIG. 15*b* demonstrates an example of DC-MAC operations (1510) in a time series. FIG. 15*a* depicts four nodes, namely the AP, and Clients A, B and C. At 1540, depicted is a key for interpreting FIGS. 15*a* and 15*b*. As seen in the key 1540, a solid line represent communications in the main channel and a dashed line indicates communications in the side channel. The four nodes are involved in a DC-MAC based exchange. With respect to the example depicted in FIGS. 15*a* and 15*b*, two communications are involved, one upload and one download. As mentioned above, an upload involves a communication from a client, (A, B, or C), to the AP. A download involves a communication from the AP to a client. In DC-MAC, only the AP functions as the side channel "receiver" (Bob in the example of FIG. 5).

As shown in FIG. 15*b*, the transmission operations are placed consecutively along the time dimension with no gap in between, and the two kinds of operations uplink and downlink are alternately scheduled. During an uplink in an upload communication, and the uplink in certain download communications, clients are allowed to send their request to the AP through a side channel. These requests are for upload communications only, and downloads are from external networks and need no request. The AP collects the requests, schedules them on the time dimension and places them in the main channel. In DC-MAC, the AP is responsible for the provisioning of fairness. The clients merely respond to the AP's coordination.

DC-MAC applies a token-based medium sharing scheme to schedule communications over the main channel. Looking at FIG. 15*b*, with regards to DC-MAC operations 1510, the AP assigns a token during a downlink operation 1550 to a client who then communicates with the AP. Notice that in 1510, the downlink operations 1550, and 1560 are alternately scheduled with the uplink communications 1570, 1590. As seen in FIGS. 15*a* and 15*b*, all requests for communication tokens from the clients to the AP, 1520, 1530, 1580, are conducted in the side channel (represented by the dashed line). As noted above, clients A, B, and C are allowed to send their requests during an uplink in an upload communication, and thud uplink in certain download communication. As seen in FIG. 15*b*, client A conducts an uplink operation in which data is sent to the AP in the main channel, and makes a request 1580 in the side channel. Client B makes a request 1520 in the side channel and an uplink operation in the main channel. Client C makes repeated requests 1530, in the side channel.

Any token scheduling algorithm is applicable. For demonstrative purposes, simple round-robin scheduling in employed. In addition, as noted above, a side channel is not an appropriate choice for sending coordination information when SNR is low. In the DC-MAC protocol, an AP is further able to calculate the per bit SNR of every packet and decide whether to use the Side channel mode according to the measured SNR. The following description further details elements of the DC-MAC design from the AP perspective and Client perspective.

With respect to the AP perspective, in DC-MAC the AP delivers token management information in the downlink operation. Each token is valid for one communication only, either upload or download. As long as the instant communication is accomplished, the AP automatically reclaims the token for the next assignment. If the token is lost, the AP reclaims the token in a time-out manner. The price for such a scenario is one packet only.

Figure 16:
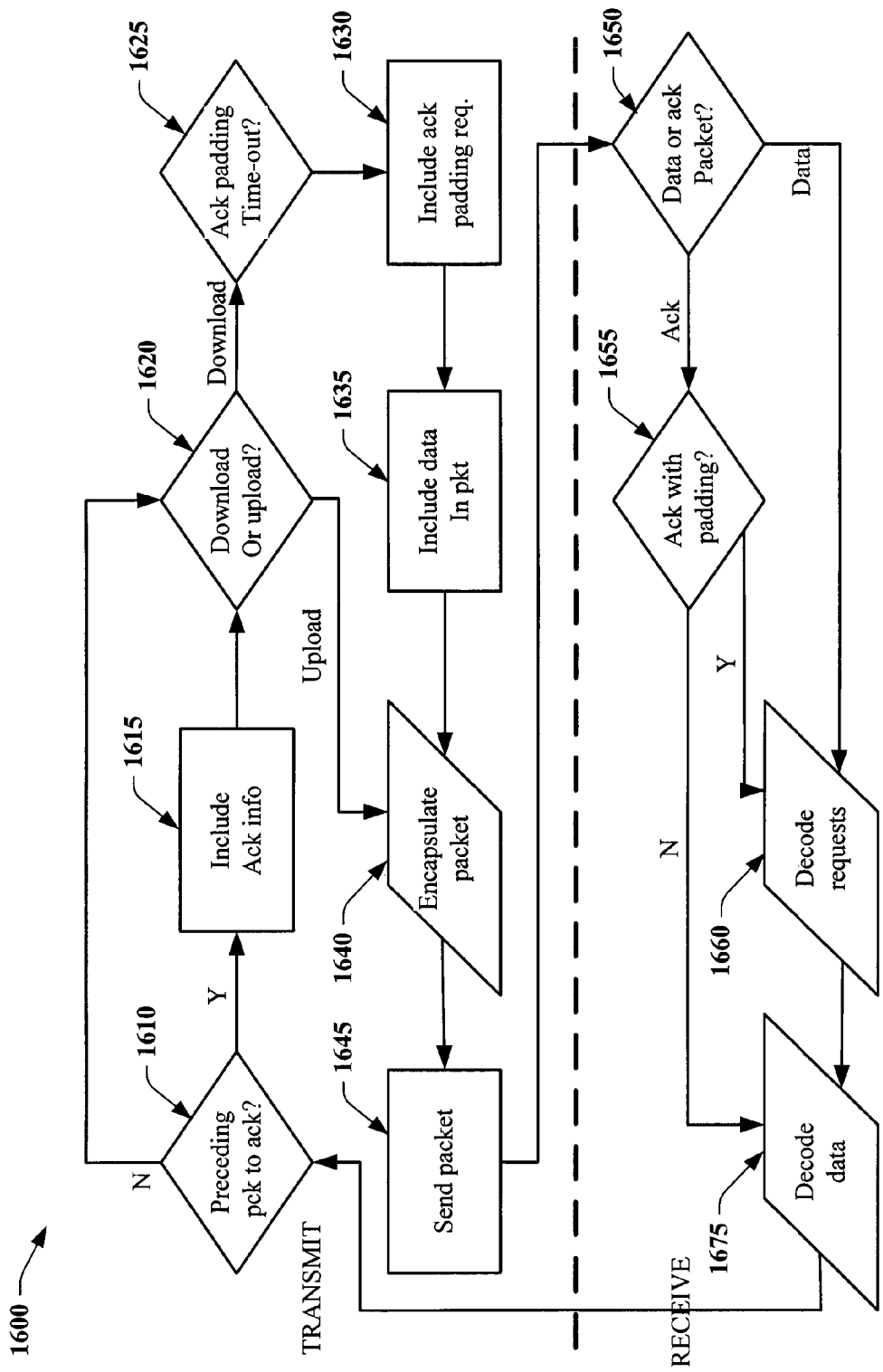
FIG. 16 presents a DC-MAC state transition diagram for an access point in accordance with an embodiment.

Presented in FIG. 16 is a DC-MAC state transition diagram for an AP. At 1610, the AP determines if there is a preceding packet to acknowledge. If there is no preceding communication, the AP moves to act 1620. If there is a preceding packet to acknowledge, at 1615, the AP prepares the acknowledgement packet to include the acknowledgement information in subsequent packet transmission. At 1620, the AP determines whether the next communication is a download or an upload.

If the subsequent communication is a download, the AP moves to act 1625. At 1625, the AP notifies the instant token hold to pad its uplink packet to a certain length in a time out manner. At 1630, the acknowledgment padding requirement is satisfied. At 1635, data is included in the packet. At 1640, the AP encapsulates the packet. Backing up to act 1620, if the subsequent transmission is an upload, the AP moves directly to act 1640 and encapsulates the packet. At 1645, the AP then sends the packet.

On the receiving side, at 1650, the AP determines whether the packet is a data packet or an acknowledgment packet. If the packet is a data packet, the AP decodes the request at 1660 and then decodes the data at 1675. If the packet is an acknowledgment packet, at 1655, the AP determines whether the Acknowledgment includes padding. If it does not include padding, then the data is merely decoded at 1675. If it does include padding then the requests are decoded at 1660 and then the data is decoded at 1675.

The DC-MAC protocol from the AP perspective is as follows. The AP first prepares the acknowledgement packet for the previous communication. The AP then encapsulates the instant downlink packet into three parts: 1) the first is the token assignment information which enables the token holder (the client in FIG. 14) to obtain the token; 2) the second part is the specification of the token requests so that the non-token holders can transmit their upload request (if there is any) through side channel; and 3) the last part, includes a synchronization sign so that clients can be synchronized with the AP. The uplink packet for an upload is much simpler. The AP simply decodes the data in main channel and uploads the requests in the side channel.

Download communications for DC-MAC in the AP (e.g., downloads from AP in FIG. 15*a*) differ from an upload communication in the following aspects. Firstly, in a download communication, the AP doesn't notify the instant token holder to pad its uplink packet to a certain length in a time-out manner so that other nodes have the opportunity to send their request. In on aspect, an acknowledgement packet is mandatorily padded to the 62 bytes so that 31 clients can be supported by an AP at most. When receiving, the AP first checks whether the acknowledgement packet is padded. In a confirmed case, the AP decodes the side channel along with the main channel. Although the DC-MAC protocol above is designed for an application comprising 31 clients, it should be appreciated that the subject DC-MAC protocol can be applied to a scenario with more clients.

Figure 17:
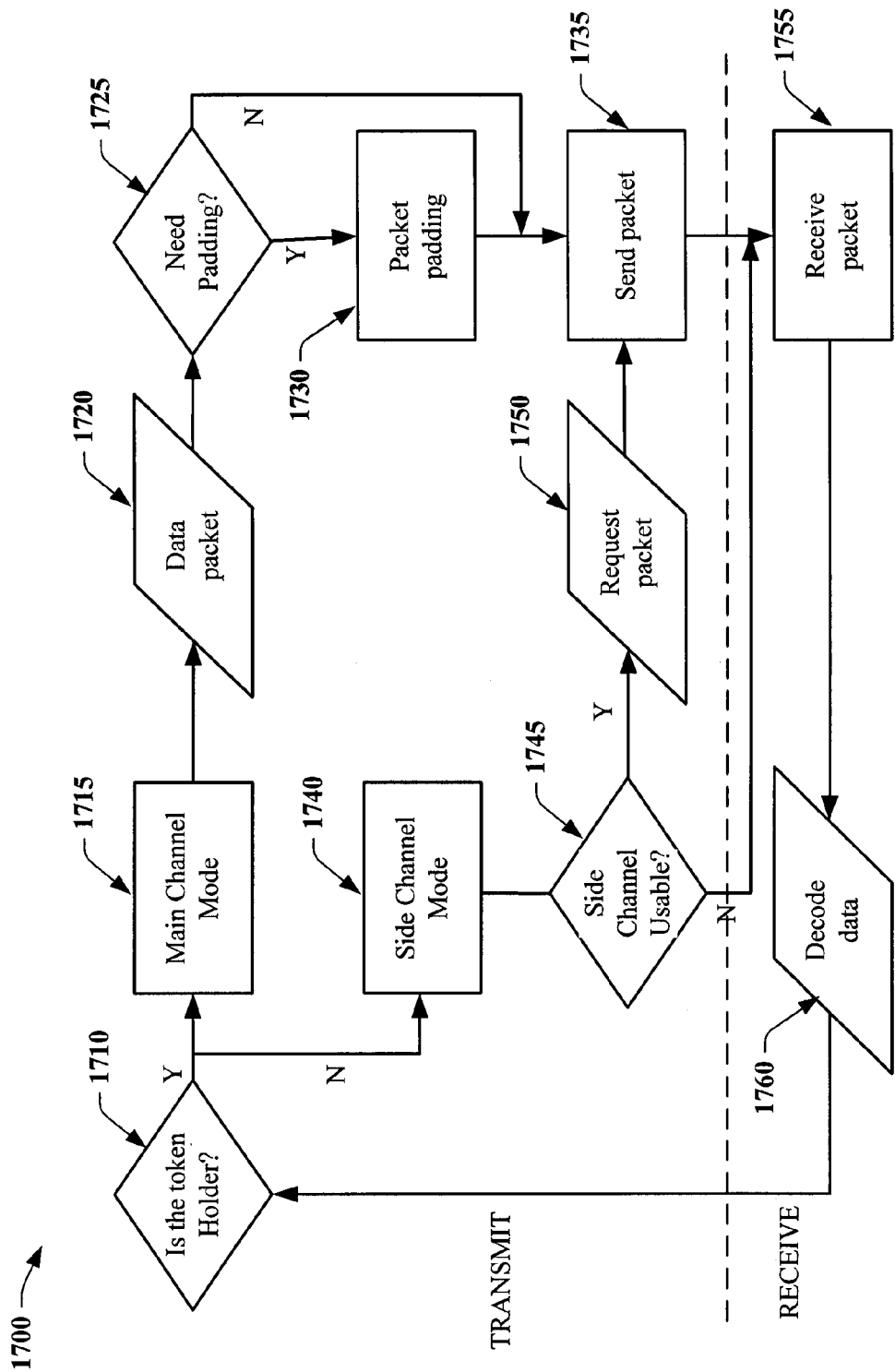
FIG. 17 presents a DC-MAC state transition diagram for a client in accordance with an embodiment.

FIG. 17 presents a DC-MAC state transition diagram for a client. At 1710, upon receiving a downlink packet, the client first determines whether he is the token holder. If no, then at 1745, the client enters side channel mode. If at 1710, the client is confirmed as the token holder, the client enters main channel mode at 1715. Then at 1720, the client generates a data packet. At 1725, a determination as to whether the packet needs padding or not is made. If padding is required, at 1730, the packet is padded prior to sending at 1735. If padding is not required the packet is merely sent at 1735.

Turning back to act 1710, where the client is not the token holder, the client then enters side channel mode at 1740. At 1745, the client determines if the side channel is useable. If yes, the client then requests a packet at 1750, and then sends the packet at 1735. If no, the client then waits to receive a packet at 1755 and upon receipt decodes the data at 1760. Returning to act 1755, at 1755 a packet is received. When the client receives a packet it merely decodes the data at 1760.

With respect to DC-MAC from the client perspective, upon receiving a downlink packet, a client first determines whether it is the token holder. If confirmed, the client enters main channel mode and begins to transmit data. In the case of the padding request, the client pads the acknowledgement as requested. When the client is not the token holder and has data to send, it will enter side channel mode as shown in FIG. 17. Before transmitting its request, the client first checks the availability of the side channel. Recall Side channel is available only when it is the upload communication or download communication with a padded acknowledge. For any other case, the client simply keeps silent.

A key issue in DC-MAC is the sending of a request through the side channel. Collisions in the side channel can lead to severe consequences and should be largely avoided. In order to avoid collisions, a time division scheduling algorithm is applied to the side channel. The side channel is partitioned into time slots and each client is then allocated with one exclusive time slot. The client then sends their request during their time slot.

In addition, clients may join and leave. A client being inactive for long period of time can be kicked out by the AP automatically. On the other hand, when a new client enters, the new client first listens to the AP's downlink packet. The downlink packet carries the sub-channel utilization information. The new client can then simply select a random un-used time slot to delivers its request. Any lost requests can be solved by repeat request.

In accordance with another aspect of DC-MAC design, every client listens to the packet of the AP and is scheduled by the AP. As a result hidden terminal problems are not an issue. It is well known that hidden terminal problem causes severe performance degradation for wireless networks. Further the RTS/CTS mechanism for 802.11 is effective at reducing hidden terminal problems, the RTS/CTS mechanism has the drawback of requiring a large amount of overhead.

Implementation of DC-MAC is now described. In one aspect of DC-MAC implementation, GNU Radio is employed as the basic platform. IEEE 802.15.4 is employed as the basic network standard since the GNU Radio software project has a mature 802.15.4 PHY layer implementation. The Universal Software Radio Peripheral version-2 devices (USRP2) is employed as the hardware platform. Each device is equipped with a XCVR2450 daughterboard for 2.4 and 5 GHz communications, employed as either a transmitter or a receiver. When used as a transmitter, it can have a DAC rate of 400M samples/s while the receiver has the ADC rate of 100M samples/s. The software aspect is based on a modified existing work of IEEE 802.15.4 PHY.

The key issue in DC-MAC implementation is the synchronization of the different clients' operation behavior. The main challenge when synchronizing different client's transmissions is overcoming the unpredictable latency in software-defined radio. For example, upon receiving a packet, an unpredictable latency can be experienced, even when a response is immediately issued. This unpredictable latency is mainly affected by the CPU processing time, operation system scheduling delay, and etc. Unpredictable latency can result in the entire DC-MAC being rendered as a false negative with different modulation schemes in the side channel. To solve this problem, a timestamp is inserted on each sample block delivered from the host system to the radio hardware. By this timestamp mechanism, the transmission behavior of different clients is synchronized. More precisely, for each transmission a mandatory delay is added before the real transmitting. This delay will be long enough to compensate all the uncontrollable latencies. In one aspect, this mandatory delay is set to be 8 ms.

Further, a time division scheduling algorithm is employed for DC-MAC. The interference pattern is set to be within 8 symbols. By setting the interference pattern to be within 8 symbols, up to 31 nodes are supported when using the maximum payload as 127 byte in IEEE 802.15.4. According to the subject embodiment, PPM is used to modulate the interference pattern due to its low false negative rate and high capacity which we will. The duration of the pulsed interference is set to 6 chips and is repeated three times for increasing its reliability. Every interfered symbol is followed by a pilot symbol due to the ability to interfere in the between of two chips. At the receiver side, the receiver recognizes any one of the three pulsed induced errors as one request protocol.

Side channel and DC-MAC provide several advantages over traditional interference management techniques. Presented below are advantages of side channel and DC-MAC and the related experiments employed to realize these advantages. The experiments and related conclusions which follow are based on the implementation of side channel and DC-MAC.

A testbed consisting of eight USRP2 devices was used to evaluate the performance of side channel and DC-MAC. The results demonstrate that the performance degradation of main channel is negligible when side channel is appropriately used, which well verifies the theoretic analysis discussed above. The results also show that DC-MAC performs better than CSMA in all situations, with improvement on overall throughput when traffic load is heavy.

In the following experiments, a set of three USRP2's acting as Alice (sender), Bob (interferer), and Carol (receiver), respectively, were used. 2.425 GHz which is in the worldwide 2.4 GHz band was employed as the carrier frequency. It should be appreciated that in each of the experiments below, the sender always continuously transmitted IEEE 802.15.4 packets. Each packet consists of 73 bytes (60-byte payload, 11-byte header, and 2-byte checksum), or 146 symbols.

Figure 18:
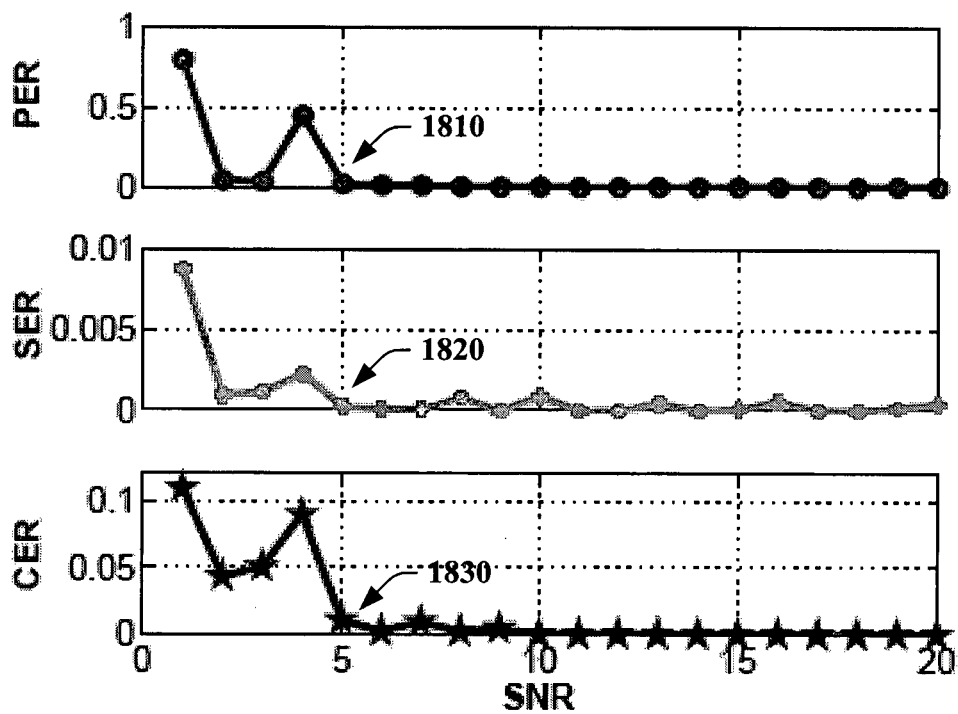
FIG. 18 is a graphical representation of the PER, SER, and CER and CER of normal transmission under different SNR.

First, to investigate the influence of noise, the interferer was turned off. The value of SNR at the receiver side was carefully tuned to 21 different levels, from 0 dB to 20 dB. For each SNR level, the sender sent 20,000 packets and the receiver recorded all chip errors, symbol errors, as well as packet losses. FIG. 18 presents a graphical representation of the packet error rate (PER) 1810, symbol error rate (SER) 1820 and chip error rate (CER) 1830, of normal transmissions under different SNR. As shown in FIG. 18, when SNR>5 dB, packet loss rarely happened (1810), SER was lower than 0.2% (1820), and CEP did not exceed 1% (1830). In particular, when SNR>10 dB, the errors caused by pure noise was negligible even at the chip level.

Figure 19:
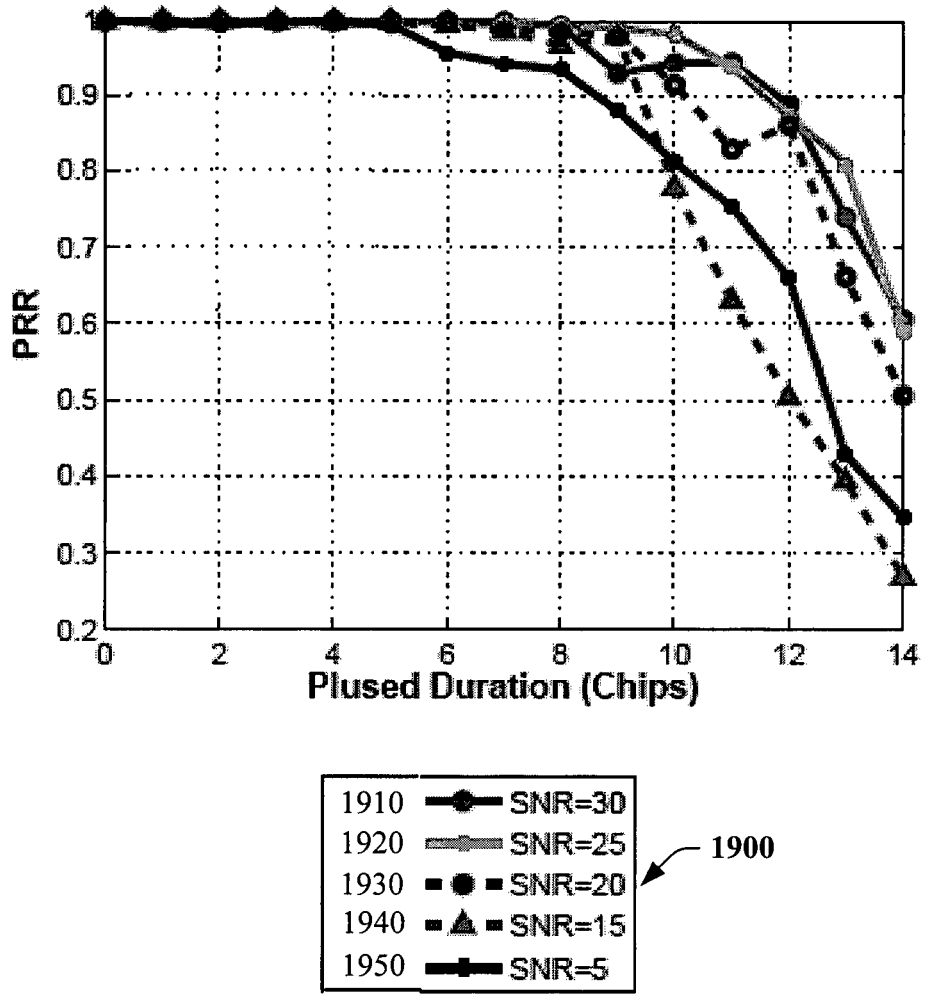
FIG. 19 is a graphical representation of the effect of different duration of interfered chips to a main channel.

Second, to investigate the influence of intended interference, the interferer was set to generate various kinds of pulsed interference with different pulse durations. FIG. 19 depicts the effect of different duration of interfered chips to the main channel or the joint effect of intended interference and noise. As presented in key 1900, line 1910 represents the packet reception rate as a function of duration of interfered chips when the SNR is 30. Line 1920 represents the packet reception rate as a function of duration of interfered chips when the SNR is 25. Line 1930 represents the packet reception rate as a function of duration of interfered chips when the SNR is 20. Line 1940 represents the packet reception rate as a function of duration of interfered chips when the SNR is 15, and line 1950 represents the packet reception rate as a function of duration of interfered chips when the SNR is 5. It was determined that if the number of interfered chips within a symbol was fewer than 8, the performance of main channel did not have significant degradation (less than 5%). This result, along with the results shown in FIG. 19, support the theoretical conclusion mentions infra. It is worth pointing out that in theory the PRR should be close to 0 when h=7 or 8 since ECC is 6, while in practice the performance is even more desirable. This is because in theory, only the worst case scenario, wherein 7 or more chip errors at any positions would lead to symbol corruption, was contemplated. However, in reality it is not the case. In other words, the parameters determined in the theoretical analysis discussed infra are overly conservative. However, the subject side channel should not be limited by the theoretical parameters.

Lastly, side channel was evaluated in terms of throughput and reliability. Channel coding enhances transmission reliability at the expense of channel capacity. In the following experiment, the interferer had 2 options on modulation scheme (PPM and PIM) and 3 options on channel coding scheme (1, 2, and 3-repeat coding). Thus, there were 6 different ways to transmit bits via side channel. For each way, we sent 1,000,000 symbols at the sender side along with the corresponding intended interference at the interferer side.

Figure 20:
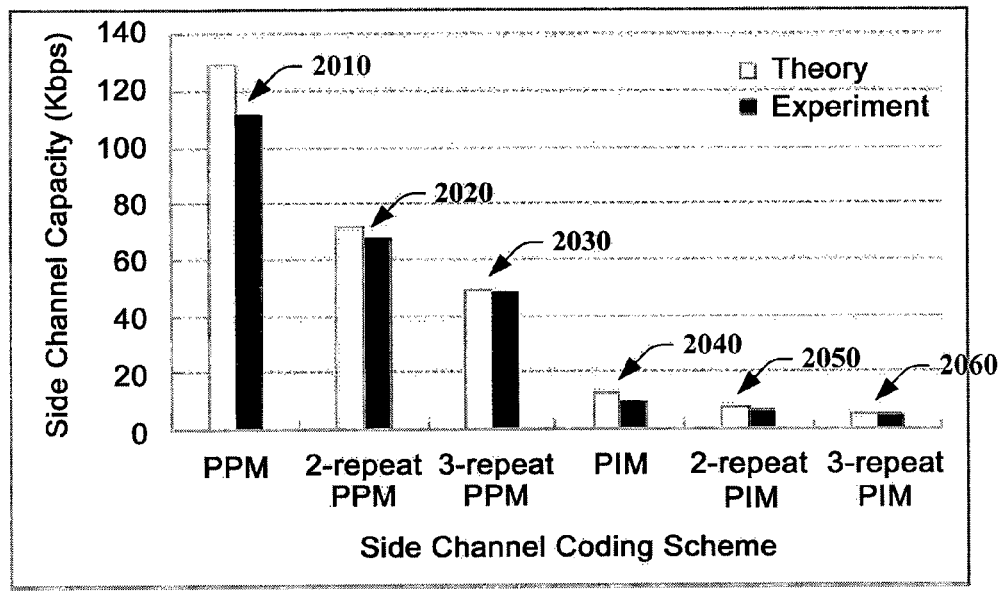
FIG. 20 is a graphical representation of the capacity of a side channel with different modulation schemes.

FIG. 20 depicts the side channel capacity with different modulations schemes. At column 2010, with a single PPM repeat, the side channel capacity was about 150 Kbps. At column 2020, with a double PPM repeat, the side channel capacity was about 70 Kbps. At column 2030, with a triple PPM repeat, the side channel capacity was about 50 Kbps. At column 2040, with a single PIM repeat, the side channel capacity was about 10 Kbps. At column 2050, with a double PIM repeat, the side channel capacity was about 35 Kbps, and at column 2056, with a triple PIM repeat, the side channel capacity was about 20 Kbps. As shown in FIG. 20, in all cases the throughput in the experiment was slightly lower than the channel capacity. This reduction was likely due to the defect of software-defined demodulator.

Figure 21:
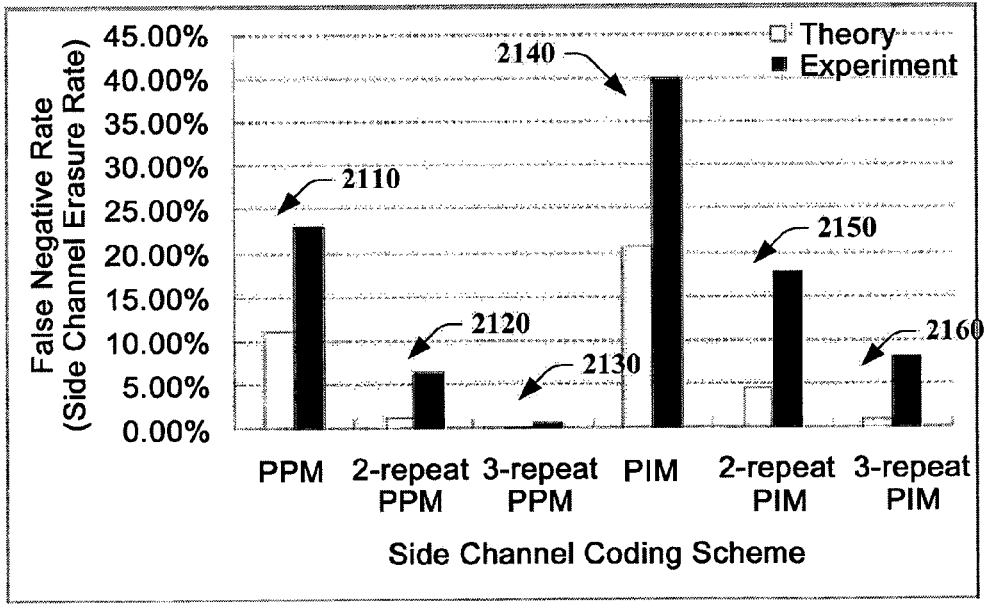
FIG. 21 is a graphical representation of false negative rates for a side channel with different modulation schemes.

Looking at FIG. 21, the reliability of the side channel was measured by the portion of incorrectly delivered bits (false negative rate). For PPM 2110 and PIM 2140 without repeat coding, the throughput was as high as 129.25 Kbps and 12.39 Kbps, respectively. For PPM 2130 and PIM 2160 with 3-repeat coding, the false negative rate was as low as 0.48% and 8.02%, respectively. Note that PPM performed better than PIM in terms of both throughput and reliability. However, when chip-level synchronization is not supported by the device, PIM is the preferred modulation scheme.

In view of the experiments above, it is apparent that a side channel has adequate capacity and reliability for transmitting a small amount of data. The following discussion compares the performance of DC-MAC, which exploits side channel, with CSMA. Prototypes of both DC-MAC and CSMA on the same platform (GNURadio and USRP2) were implemented in experimentation. The devices employed included 1 USRP2 as the AP and up to 7 USRP2 as the users of clients. The DC-MAC employed used 3-repeat PPM as the side channel modulation and coding scheme.

Figure 23:
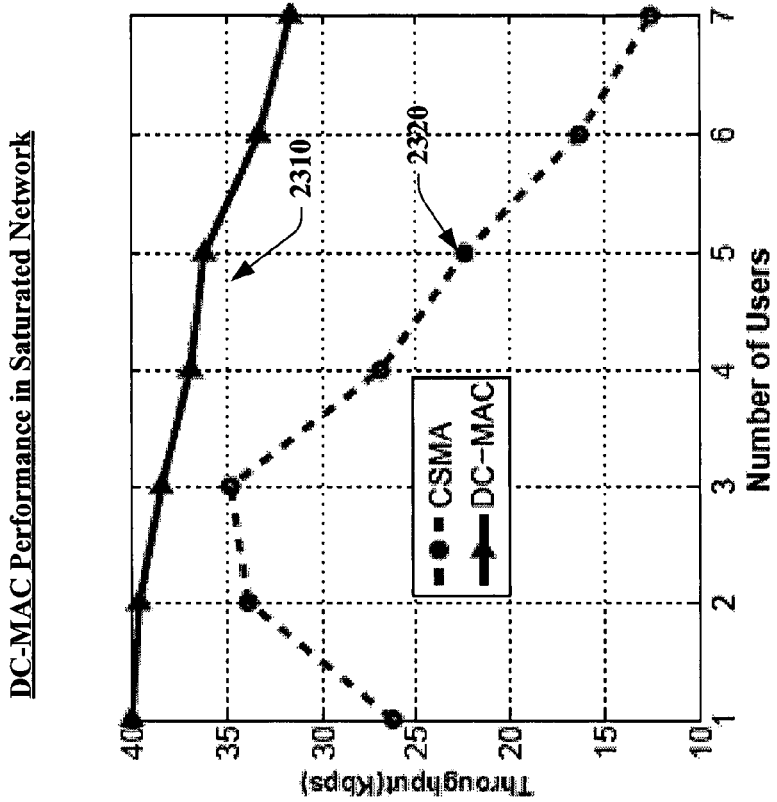
FIG. 23 is a graphical representation of DC-MAC performance in a saturated network.
Figure 22:
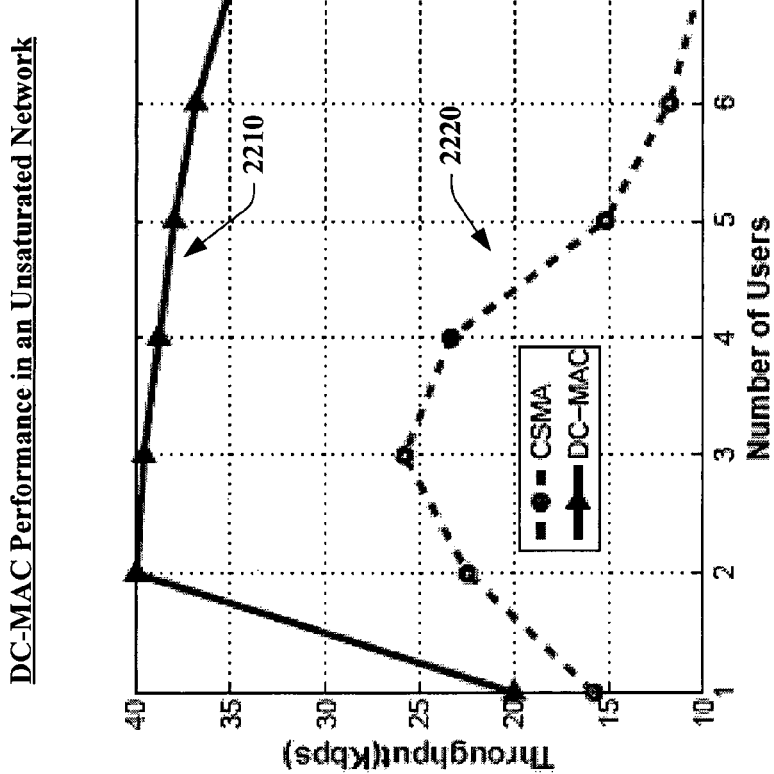
FIG. 22 is a graphical representation of DC-MAC performance in an unsaturated network.

The overall network throughput was investigated while the number of user nodes varied. Each user node could send at a maximum speed of 62 packets per second (e.g., no waiting time). It should be note that generally, it takes around 8 ms to transmit a packet at the sender side or to transmit an ACK at the AP side. Hence, it takes around 16 ms to deliver a packet in a round trip. As a result at most 1000/16=62.5 packets can be sent in one second. FIG. 22 shows the overall throughput when the packet rate of each node was fixed to 31 packets per second which is half of the maximum speed. FIG. 23 shows system throughput under a saturation condition which is a condition wherein every device always had a packet to transmit. In FIGS. 22 and 23, lines 2210 and 2310 respectively denote DC-MAC performance. In FIGS. 22 and 23, lines 2220 and 2320 respectively denote CSMA performance.

As seen in FIGS. 22 and 23, DC-MAC outperforms CSMA in all cases. Further, as the number of users increases, the performance of CSMA 2220, 2320 decreased dramatically due to transmission collisions, while the performance of DC-MAC 2210, 2310 degraded gracefully since it was completely collision free and all packet losses were induced by intended interference. However, the packet loss in this experiment seems worse than that shown in FIG. 21. This result is suspected as due to the drawbacks of software-defined signal processing. For example, even when there was only 1 user where CSMA had no any packet collision, the extra back-off time and carrier sensing overhead also made CSMA slower than DC-MAC. In both cases, DC-MAC had up to 250% performance gain (7 users) against CSMA in terms of overall throughput.

Figures 24, 25:
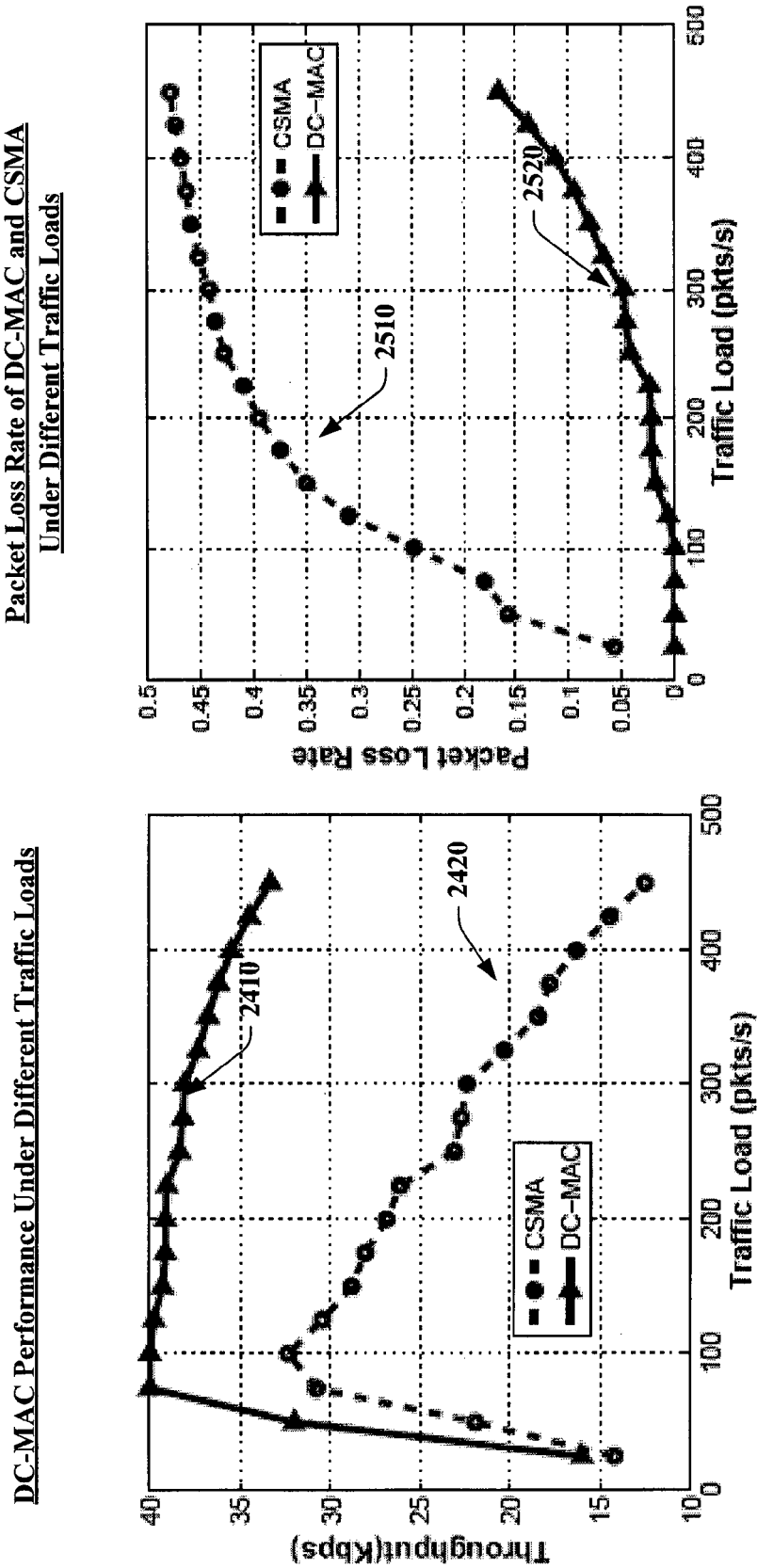
FIG. 24 is a graphical representation of DC-MAC performance under different traffic loads.
FIG. 25 is a graphical representation of the packet loss rate of DC-MAC and CSMA under different traffic loads.

FIG. 24 presents DC-MAC performance under different traffic loads. In FIG. 24 line 2410 denotes DC-MAC performance and line 2420 denotes CSMA performance. FIG. 24 demonstrates how DC-MAC, 2410 outperforms when the number of users is fixed to 7 but the overall traffic load varies. Additionally, FIG. 25 depicts packet loss rate of DC-MAC and CSMA under different traffic loads. In FIG. 25 line 2510 denotes DC-MAC performance and line 2520 denotes CSMA performance. FIG. 25 unveils the major reason why DC-MAC can easily outperform CSMA. A large portion of packets are corrupted by collision in CSMA. DC-MAC does not share the same problem since it always suppresses packet sending at the user side unless the AP asks it to do so. From FIG. 25, it was determined that packet loss rate drops seriously when traffic load increases. This was likely due to the increasing interference which may induce more packet loss. Thus subject tests results show that the maximum packet loss rate of DC-MAC was 16.61%. Further, an even lower packet loss rate is envisioned with a more robust demodulator.

Figure 26:
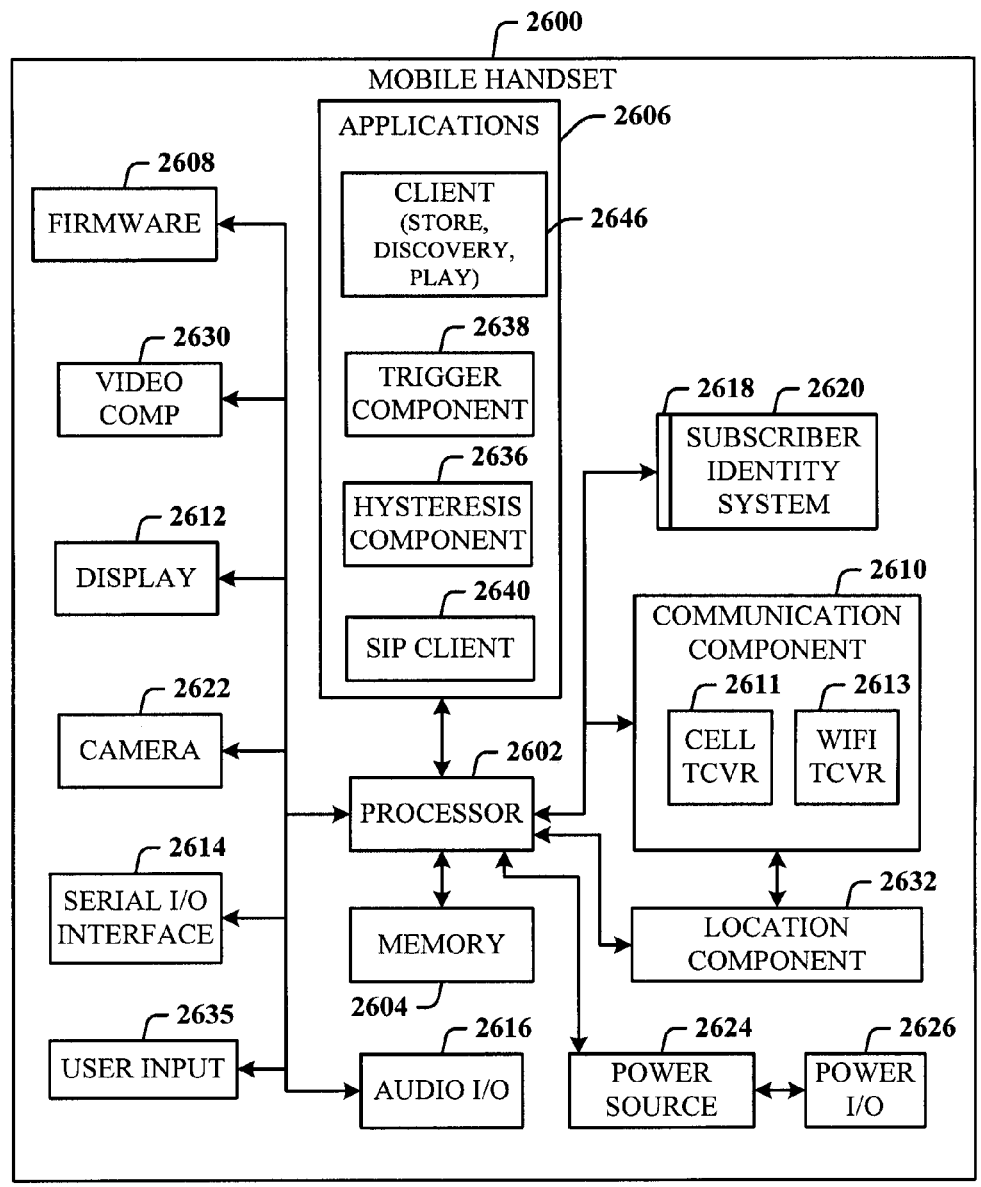
FIG. 26 illustrates an example of a device, a mobile handset that, can process multimedia content in accordance with the embodiments disclosed herein.

FIG. 26 illustrates a schematic block diagram of an exemplary device 2600 capable of employing the subject system in accordance with some embodiments of the invention. The device is a mobile handset 2600 In order to provide additional context for various aspects thereof, FIG. 26 and the following discussion are intended to provide a brief, general description of a suitable environment 2600 in which the various aspects can be implemented. While the description includes a general context of computer-executable instructions, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the inventive methods can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of computer-readable media. Computer readable media can be any available media that can be accessed by the computer and includes both volatile and non-volatile media, removable and non-removable media. By way of example and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 2600 includes a processor 2602 for controlling and processing all onboard operations and functions. A memory 2604 interfaces to the processor 2602 for storage of data and one or more applications 2606 (e.g., a video player software, user feedback component software, . . . ). Other applications can include voice recognition of predetermined voice commands that facilitate initiation of the user feedback signals. The applications 2606 can be stored in the memory 2604 and/or in a firmware 2608, and executed by the processor 2602 from either or both the memory 2604 or/and the firmware 2608. The firmware 2608 can also store startup code for execution in initializing the handset 2600. A communications component 2610 interfaces to the processor 2602 to facilitate wired/wireless communication with external systems, e.g., cellular networks, VoIP networks, and so on. Here, the communications component 2610 can also include a suitable cellular transceiver 2611 (e.g., a GSM transceiver) and an unlicensed transceiver 2613 (e.g., WiFi, WiMax) for corresponding signal communications. The handset 2600 can be a device such as a cellular telephone, a PDA with mobile communications capabilities, and messaging-centric devices. The communications component 2610 also facilitates communications reception from terrestrial radio networks (e.g., broadcast), digital satellite radio networks, and Internet-based radio services networks.

The handset 2600 includes a display 2612 for displaying text, images, video, telephony functions (e.g., a Caller ID function), setup functions, and for user input. The display 2612 can also accommodate the presentation of multimedia content (e.g., music metadata, messages, wallpaper, graphics, . . . ). A serial I/O interface 2614 is provided in communication with the processor 2602 to facilitate wired and/or wireless serial communications (e.g., USB, and/or IEEE 1394) through a hardwire connection, and other serial input devices (e.g., a keyboard, keypad, and mouse). This supports updating and troubleshooting the handset 2600, for example. Audio capabilities are provided with an audio I/O component 2616, which can include a speaker for the output of audio signals related to, for example, indication that the user pressed the proper key or key combination to initiate the user feedback signal. The audio I/O component 2616 also facilitates the input of audio signals through a microphone to record data and/or telephony voice data, and for inputting voice signals for telephone conversations.

The handset 2600 can include a slot interface 2618 for accommodating a SIC (Subscriber Identity Component) in the form factor of a card Subscriber Identity Module (SIM) or universal SIM 2620, and interfacing the SIM card 2620 with the processor 2602. However, it is to be appreciated that the SIM card 920 can be manufactured into the handset 2600, and updated by downloading data and software thereinto.

The handset 2600 can process IP data traffic through the communication component 2610 to accommodate IP traffic from an IP network such as, for example, the Internet, a corporate intranet, a home network, a person area network, etc., through an ISP or broadband cable provider. Thus, VoIP traffic can be utilized by the handset 2600 and IP-based multimedia content can be received in either an encoded or decoded format.

A video processing component 2622 (e.g., a camera) can be provided for decoding encoded multimedia content. The handset 2600 also includes a power source 2624 in the form of batteries and/or an AC power subsystem, which power source 2624 can interface to an external power system or charging equipment (not shown) by a power I/O component 2626.

The handset 2600 can also include a video component 2630 for processing video content received and, for recording and transmitting video content. A location tracking component 932 facilitates geographically locating the handset 2600. As described hereinabove, this can occur when the user initiates the feedback signal automatically or manually. A user input component 2634 facilitates the user initiating the quality feedback signal. The input component can include such conventional input device technologies such as a keypad, keyboard, mouse, stylus pen, and touch screen, for example.

Referring again to the applications 2606, a hysteresis component 2636 facilitates the analysis and processing of hysteresis data, which is utilized to determine when to associate with the access point. A software trigger component 2638 can be provided that facilitates triggering of the hysteresis component 2638 when the WiFi transceiver 2613 detects the beacon of the access point. A SIP client 940 enables the handset 2600 to support SIP protocols and register the subscriber with the SIP registrar server. The applications 2606 can also include a client 2642 that provides at least the capability of discovery, play and store of multimedia content, for example, music.

The handset 2600, as indicated above related to the communications component 910, includes an indoor network radio transceiver 2613 (e.g., WiFi transceiver). This function supports the indoor radio link, such as IEEE 802.11, for the dual-mode GSM handset 2600. The handset 2600 can accommodate at least satellite radio services through a handset that can combine wireless voice and digital radio chipsets into a single handheld device.

Figure 27:
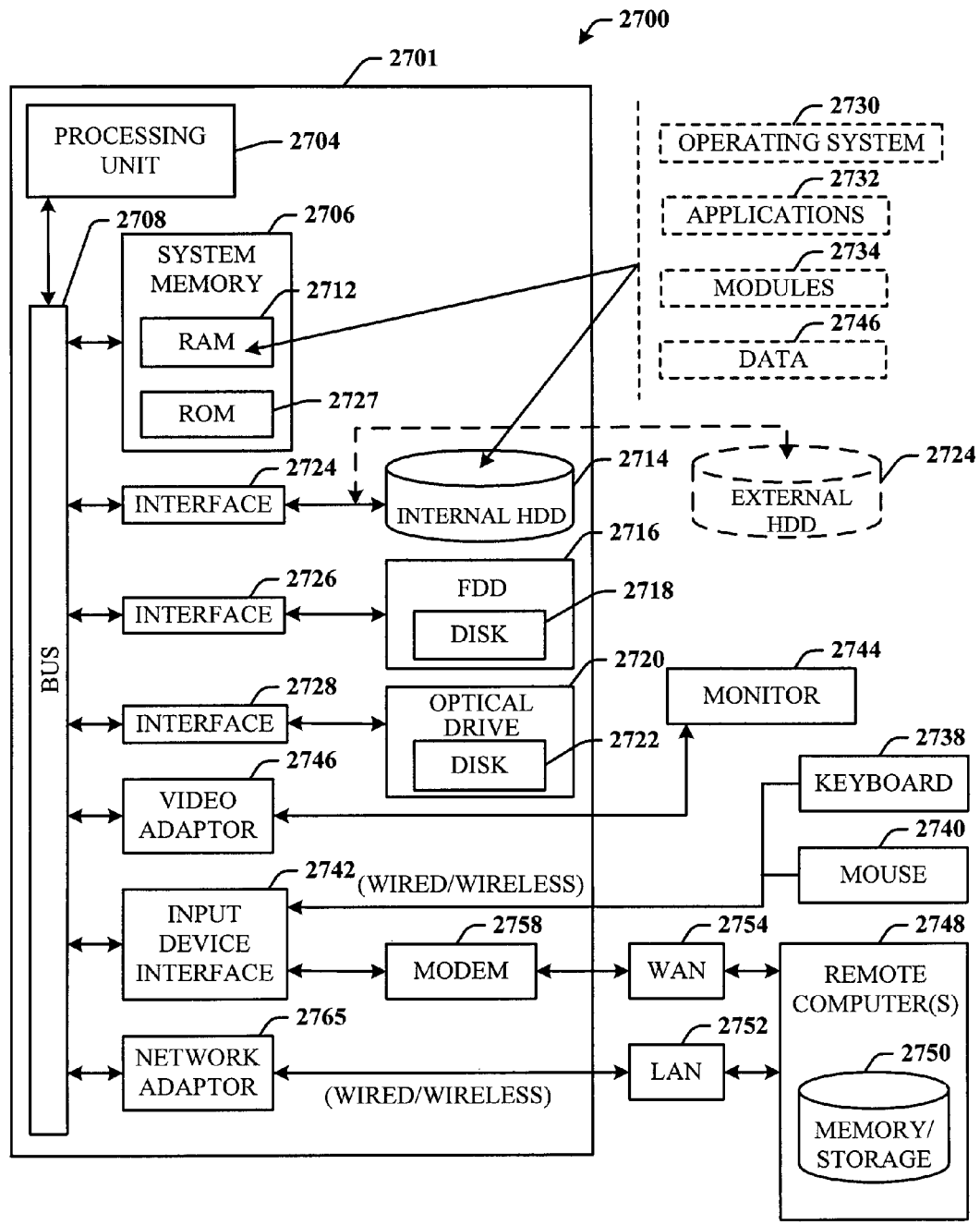
FIG. 27 illustrates a block diagram of a computer operable to execute the disclosed multi-device usage monitoring and communicating system architecture.

Referring now to FIG. 27, there is illustrated a block diagram of a computer operable to provide networking and communication capabilities between a wired or wireless communication network and a server and/or communication device. In order to provide additional context for various aspects thereof, FIG. 27 and the following discussion are intended to provide a brief, general description of a suitable computing environment 2700 in which the various aspects of the innovation can be implemented. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

A computer typically includes a variety of computer readable media. Computer readable media can be any available media that can be accessed by the computer and includes both volatile and non-volatile media, removable and non-removable media. By way of example, and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 27, the exemplary environment 2700 for implementing various aspects includes a computer 2702, the computer 2702 including a processing unit 2704, a system memory 2706 and a system bus 2708. The system bus 2708 couples system components including, but not limited to, the system memory 2706 to the processing unit 2704. The processing unit 2704 can be any of various commercially available processors. Dual microprocessors and other multi processor architectures can also be employed as the processing unit 2704.

The system bus 2708 can be any of several types of bus structure that can further interconnect to a memory bus (with or without a memory controller), a peripheral bus, and a local bus using any of a variety of commercially available bus architectures. The system memory 2706 includes read-only memory (ROM) 2710 and random access memory (RAM) 2712. A basic input/output system (BIOS) is stored in a non-volatile memory 2710 such as ROM, EPROM, EEPROM, which BIOS contains the basic routines that help to transfer information between elements within the computer 2702, such as during start-up. The RAM 2712 can also include a high-speed RAM such as static RAM for caching data.

The computer 2702 further includes an internal hard disk drive (HDD) 2714 (e.g., EIDE, SATA), which internal hard disk drive 2714 can also be configured for external use in a suitable chassis (not shown), a magnetic floppy disk drive (FDD) 2716, (e.g., to read from or write to a removable diskette 2718) and an optical disk drive 2720, (e.g., reading a CD-ROM disk 1022 or, to read from or write to other high capacity optical media such as the DVD). The hard disk drive 2714, magnetic disk drive 2716 and optical disk drive 2727 can be connected to the system bus 2708 by a hard disk drive interface 2724, a magnetic disk drive interface 2726 and an optical drive interface 2728, respectively. The interface 2724 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 2702, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, can also be used in the exemplary operating environment, and further, that any such media can contain computer-executable instructions for performing the methods of the disclosed innovation.

A number of program modules can be stored in the drives and RAM 2712, including an operating system 2730, one or more application programs 2732, other program modules 2734 and program data 2736. All or portions of the operating system, applications, modules, and/or data can also be cached in the RAM 2712. It is to be appreciated that the innovation can be implemented with various commercially available operating systems or combinations of operating systems.

A user can enter commands and information into the computer 2702 through one or more wired/wireless input devices, e.g., a keyboard 2738 and a pointing device, such as a mouse 2740. Other input devices (not shown) may include a microphone, an IR remote control, a joystick, a game pad, a stylus pen, touch screen, or the like. These and other input devices are often connected to the processing unit 2704 through an input device interface 2742 that is coupled to the system bus 2708, but can be connected by other interfaces, such as a parallel port, an IEEE 2394 serial port, a game port, a USB port, an IR interface, etc.

A monitor 2744 or other type of display device is also connected to the system bus 2708 through an interface, such as a video adapter 2746. In addition to the monitor 2744, a computer typically includes other peripheral output devices (not shown), such as speakers, printers, etc.

The computer 2702 can operate in a networked environment using logical connections by wired and/or wireless communications to one or more remote computers, such as a remote computer(s) 2748. The remote computer(s) 2748 can be a workstation, a server computer, a router, a personal computer, portable computer, microprocessor-based entertainment appliance, a peer device or other common network node, and typically includes many or all of the elements described relative to the computer 2702, although, for purposes of brevity, only a memory/storage device 2750 is illustrated. The logical connections depicted include wired/wireless connectivity to a local area network (LAN) 2752 and/or larger networks, e.g., a wide area network (WAN) 2754. Such LAN and WAN networking environments are commonplace in offices and companies, and facilitate enterprise-wide computer networks, such as intranets, all of which may connect to a global communications network, e.g., the Internet.

When used in a LAN networking environment, the computer 2702 is connected to the local network 2752 through a wired and/or wireless communication network interface or adapter 2756. The adaptor 2756 may facilitate wired or wireless communication to the LAN 2752, which may also include a wireless access point disposed thereon for communicating with the wireless adaptor 2756.

When used in a WAN networking environment, the computer 2702 can include a modem 2758, or is connected to a communications server on the WAN 2754, or has other means for establishing communications over the WAN 2754, such as by way of the Internet. The modem 2758, which can be internal or external and a wired or wireless device, is connected to the system bus 2708 through the serial port interface 2742. In a networked environment, program modules depicted relative to the computer 2702, or portions thereof, can be stored in the remote memory/storage device 2750. It will be appreciated that the network connections shown are exemplary and other means of establishing a communications link between the computers can be used.

The computer 2702 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least WiFi and Bluetooth™ wireless technologies. Thus, the communication can be a predefined structure as with a conventional network or simply an ad hoc communication between at least two devices.

WiFi, or Wireless Fidelity, allows connection to the Internet from a couch at home, a bed in a hotel room, or a conference room at work, without wires. WiFi is a wireless technology similar to that used in a cell phone that enables such devices, e.g., computers, to send and receive data indoors and out; anywhere within the range of a base station. WiFi networks use radio technologies called IEEE 802.11(a, b, g, etc.) to provide secure, reliable, fast wireless connectivity. A WiFi network can be used to connect computers to each other, to the Internet, and to wired networks (which use IEEE 802.3 or Ethernet). WiFi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A device, comprising:
a memory that stores computer executable components; and
a processor that executes or facilitate execution of computer executable components stored in the memory, the computer executable components comprising:
a control component that generates control information; and
an interference component that transmits the control information to a second device via a side channel as patterned interference data generated via a pulse modulation scheme that is based on direct-sequence spread-spectrum modulation, wherein the interference component concurrently transmits the control information with other data being transmitted to the second device via a main channel, and wherein the side channel and the main channel employ a same frequency band and a same amount of bandwidth to transmit the patterned interference data and the other data.

2. The device of claim 1, wherein the device transmits the other data to the second device.

3. The device of claim 1, wherein the other data being transmitted to the second device originates from a third device.

4. The device of claim 1, wherein the interference component transmits the patterned interference data with an energy level determined to enable the second device to identify a pattern without corruption of the other data.

5. The device of claim 1, wherein the interference component employs a dynamic cooperation multi-access channel protocol to schedule transmission of the other data via the main channel and to employ the side channel for control and coordination of data transmissions.

6. The device of claim 1, wherein the interference component employs pulse interval modulation in connection with transmission of the control information using the patterned interference data.

7. A device, comprising:
a memory that stores computer executable components; and
a processor that executes or facilitate execution of computer executable components stored in the memory, the computer executable components comprising:
a demodulator component configured to receive patterned interference data, generated via a pulse modulation scheme that is based on direct-sequence spread-spectrum modulation, and transmitted to the device via a side channel concurrently with other data transmitted to the device via a main channel, wherein the side channel and the main channel employ a same frequency band and a same amount of bandwidth to transmit the patterned interference data and the other data; and
an error pattern analyzer component configured to extract control information from the patterned interference data.

8. The device of claim 7, wherein the demodulator component is configured to receive the patterned interference data and the other data from a single device.

9. The device of claim 7, wherein the demodulator component is configured to receive the patterned interference data and the other data from different devices.

10. A method, comprising:
generating, by a first device comprising a processor, control information;
generating, by the first device, patterned interference data representative of the control information using direct-sequence spread-spectrum pulse modulation;
transmitting, by the first device, the patterned interference data to a second device via a side channel concurrently with other data being transmitted to the second device via a main channel, wherein the side channel and the main channel employ a same frequency band and a same amount of bandwidth to transmit the patterned interference data and the other data.

11. The method of claim 10, wherein the transmitting comprises transmitting the patterned interference data with an energy level determined to enable the second device to identify an underlying pattern in the patterned interference data without corrupting the other data.

12. The method of claim 10, wherein the transmitting comprises transmitting the control information while a third device is determined to be transmitting the other data on the main channel.

13. The method of claim 10, wherein the transmitting further comprises transmitting, by the first device, the other data to the second device.

14. The method of claim 13, further comprising:
employing a dynamic cooperation multi-access channel protocol to schedule the transmitting of the other data on the main channel.

15. The method of claim 10, wherein the modulation comprises pulse interval position modulation or pulse position modulation.

16. A method, comprising:
receiving, by a device comprising a processor, first data transmitted to the device via a main channel;
receiving, by a device, at a time coinciding with the receiving the first data, patterned interference data generated via a pulse modulation that is based on direct-sequence spread-spectrum modulation and transmitted to the device via a side channel, wherein the side channel and the main channel employ a same or substantially same frequency band and a same amount of bandwidth to transmit the patterned interference data and the first data; and
extracting, by the device, control information from the patterned interference data.

17. The method of claim 16, wherein the receiving the first data and the patterned interference data includes receiving the first data and the patterned interference data from a single device.

18. The method of claim 16, wherein the receiving the first data and the patterned interference data includes receiving the first data and the patterned interference data from different devices.

19. A device, comprising;
means for generating control information;
means for generating patterned interference data representative of the control information using a pulse modulation scheme that is based on direct-sequence spread-spectrum modulation;
means for transmitting the patterned interference data to a second device via a side channel while other data is being transmitted to the second device via a main channel, wherein the side channel and the main channel employ a same frequency band and a same amount of bandwidth to transmit the patterned interference data and the other data.

20. The device of claim 19, wherein the means for transmitting further comprises means for transmitting the patterned interference data with an energy level determined to enable the second device to identify a pattern in the patterned interference data representative of the control information without corruption of the other data.

21. A non-transitory computer-readable storage medium having stored code instructions thereon that, in response to execution by a computing system, cause the computing system to carry out operations, comprising:

receiving message data via a main channel;

receiving patterned interference data via a side channel concurrently with the message data, wherein the patterned interference data is generated via a pulse modulation scheme that is based on direct-sequence spread-spectrum modulation, and wherein the main channel and the side channel employ a same frequency band and a same amount of bandwidth to transmit the patterned interference data and the message data; and extracting control information from the patterned interference data.

22. The non-transitory computer readable medium of claim 21, the operations further comprising:

decoding the message data and decoding the control information.

23. The device of claim 19, wherein the pulse modulation scheme comprises pulse position modulation or pulse interval modulation.

* * * * *